(12) United States Patent
Butler

(10) Patent No.: US 12,303,079 B2
(45) Date of Patent: May 20, 2025

(54) DISPENSER SYSTEM

(71) Applicant: DEB IP LIMITED, Denby (GB)

(72) Inventor: Robert Butler, Nottinghamshire (GB)

(73) Assignee: DEB IP LIMITED, Denby (GB)

( * ) Notice: Subject to any disclaimer, the term of this patent is extended or adjusted under 35 U.S.C. 154(b) by 0 days.

(21) Appl. No.: 18/237,073

(22) Filed: Aug. 23, 2023

(65) Prior Publication Data

US 2023/0389755 A1    Dec. 7, 2023

Related U.S. Application Data

(62) Division of application No. 17/496,192, filed on Oct. 7, 2021, now Pat. No. 11,744,412.

(51) Int. Cl.
*A47K 5/12* (2006.01)
*F16B 2/20* (2006.01)

(52) U.S. Cl.
CPC .............. *A47K 5/1207* (2013.01); *F16B 2/20* (2013.01)

(58) Field of Classification Search
CPC ........... A47K 5/1207; A47K 5/12; F16B 2/20; B05B 11/0038; B05B 11/0008
See application file for complete search history.

(56) References Cited

U.S. PATENT DOCUMENTS

| | | |
|---|---|---|
| 5,445,288 A | 8/1995 | Banks |
| 5,556,005 A | 9/1996 | Banks |
| 6,309,134 B1 | 10/2001 | Hann |
| 6,619,509 B2 | 9/2003 | DeKoning et al. |
| 6,729,502 B2 | 5/2004 | Lewis et al. |
| 6,729,503 B2 | 5/2004 | DeKoning et al. |
| 6,772,916 B1 | 8/2004 | Reynolds |
| 7,066,357 B2 | 6/2006 | Ciavarella et al. |
| 7,086,567 B1 | 8/2006 | Ciavarella et al. |
| 7,114,639 B2 | 10/2006 | Lewis et al. |
| 7,198,177 B2 | 4/2007 | Ganzeboom |
| 7,232,045 B2 | 6/2007 | Ophardt et al. |
| 7,278,554 B2 | 10/2007 | Armstrong |
| 7,527,178 B2 | 5/2009 | Lewis |

(Continued)

FOREIGN PATENT DOCUMENTS

| | | |
|---|---|---|
| DE | 102018008954 A1 | 5/2020 |
| EP | 1345519 A1 | 9/2003 |

(Continued)

OTHER PUBLICATIONS

International Search Report and Written Opinion in related application PCT/IB2022/059566, Jan. 20, 2023, 12 pages.

*Primary Examiner* — Bob Zadeh
(74) *Attorney, Agent, or Firm* — Quarles & Brady LLP

(57) ABSTRACT

A method of providing a dispenser for dispensing a fluid includes the provision of a dispenser body and the provision of a first adaptor that is configured to couple a first cartridge to the dispenser body. The first adaptor defines a first dimension that corresponds to a portion of the first cartridge. Further, the method includes the provision of a second adaptor that is configured to couple a second cartridge to the dispenser body. The second adaptor defines a second dimension that corresponds to a portion of the second cartridge. In some embodiments, the first dimension is different from the second dimension, and the first adaptor and the second adaptor are configured to be flexible.

22 Claims, 12 Drawing Sheets

(56) References Cited

U.S. PATENT DOCUMENTS

| | | |
|---|---|---|
| 7,611,033 B2 | 11/2009 | Ganzeboom |
| 7,984,829 B2 | 7/2011 | Cittadino et al. |
| 8,047,403 B2 | 11/2011 | Quinlan et al. |
| 8,047,404 B2 | 11/2011 | Quinlan et al. |
| 8,104,650 B2 | 1/2012 | Lang et al. |
| 8,201,707 B2 | 6/2012 | Ophardt |
| 8,215,523 B2 | 7/2012 | Ophardt |
| 8,261,950 B2 | 9/2012 | Cittadino et al. |
| 8,276,784 B2 | 10/2012 | Ciavarella et al. |
| 8,313,010 B2 | 11/2012 | Quinlan et al. |
| 8,336,740 B1 | 12/2012 | Daansen |
| 8,348,101 B2 | 1/2013 | Ciavarella et al. |
| 8,360,285 B2 | 1/2013 | Grbesic |
| 8,365,954 B2 | 2/2013 | Ophardt et al. |
| 8,387,830 B2 | 3/2013 | Proper et al. |
| 8,479,951 B2 | 7/2013 | Ciavarella et al. |
| 8,496,142 B2 | 7/2013 | Uehira et al. |
| 8,499,981 B2 | 8/2013 | Quinlan et al. |
| 8,528,787 B2 | 9/2013 | Cittadino et al. |
| 8,561,441 B2 | 10/2013 | Herrmann et al. |
| 8,561,847 B2 | 10/2013 | Rosenkranz et al. |
| 8,668,116 B2 | 3/2014 | Ciavarella et al. |
| 8,672,183 B2 | 3/2014 | Ophardt et al. |
| 8,672,187 B2 | 3/2014 | Ophardt |
| 8,684,236 B2 | 4/2014 | Ophardt |
| 8,733,596 B2 | 5/2014 | Ophardt et al. |
| 8,746,510 B2 | 6/2014 | Cittadino et al. |
| 8,807,398 B2 | 8/2014 | Sundberg et al. |
| 8,814,005 B2 | 8/2014 | Banks et al. |
| 8,820,585 B1 | 9/2014 | Banks et al. |
| 8,844,769 B2 | 9/2014 | Rosenkranz et al. |
| 8,851,331 B2 | 10/2014 | Pelkey et al. |
| 8,955,718 B2 | 2/2015 | Ciavarella et al. |
| 9,027,788 B2 | 5/2015 | Ophardt et al. |
| 9,027,790 B2 | 5/2015 | Ciavarella et al. |
| 9,038,862 B2 | 5/2015 | McNulty et al. |
| 9,073,066 B2 | 7/2015 | Banks et al. |
| 9,089,860 B2 | 7/2015 | Quinlan et al. |
| 9,105,203 B2 | 8/2015 | Carlson et al. |
| 9,149,161 B2 | 10/2015 | Ophardt et al. |
| 9,172,266 B2 | 10/2015 | Curtis et al. |
| 9,179,808 B2 | 11/2015 | McNulty et al. |
| 9,204,765 B2 | 12/2015 | McNulty et al. |
| 9,302,285 B2 | 4/2016 | Marbet et al. |
| 9,307,871 B2 | 4/2016 | McNulty et al. |
| 9,340,337 B2 | 5/2016 | Pelkey et al. |
| 9,522,773 B2 | 12/2016 | Tom et al. |
| 9,539,598 B2 | 1/2017 | Ciavarella et al. |
| 9,611,839 B2 | 4/2017 | McNulty et al. |
| 9,616,445 B2 | 4/2017 | Ciavarella et al. |
| 9,682,390 B2 | 6/2017 | Ophardt et al. |
| 9,700,181 B1 | 7/2017 | Santoro et al. |
| 9,750,377 B2 | 9/2017 | Bai |
| 9,797,539 B1 | 10/2017 | Kamiyama |
| 9,854,947 B2 | 1/2018 | McNulty et al. |
| 9,936,841 B2 | 4/2018 | Ophardt et al. |
| 10,034,583 B2 | 7/2018 | Carignan et al. |
| 10,034,585 B2 | 7/2018 | Moore et al. |
| 10,149,575 B2 | 12/2018 | Tojek et al. |
| 10,242,301 B2 | 3/2019 | Ophardt et al. |
| 10,485,385 B2 | 11/2019 | Tojek et al. |
| 10,660,983 B2 | 5/2020 | Jennings |
| 10,671,902 B2 | 6/2020 | Ophardt et al. |
| 10,765,620 B2 | 9/2020 | Fedyna |
| 2005/0048640 A1 | 3/2005 | Kennedy |
| 2009/0101671 A1* | 4/2009 | Cittadino ............. A47K 5/1202 222/207 |
| 2010/0176155 A1* | 7/2010 | Baron .................. B67D 1/0079 222/207 |
| 2012/0080452 A1 | 4/2012 | Boshuizen |
| 2012/0325857 A1* | 12/2012 | Ophardt ............... A47K 5/1207 222/325 |
| 2018/0009565 A1 | 1/2018 | Carlson et al. |
| 2019/0156652 A1 | 5/2019 | Berland |
| 2019/0231148 A1 | 8/2019 | Banks et al. |
| 2019/0299228 A1 | 10/2019 | Ophardt et al. |
| 2019/0330891 A1 | 10/2019 | Pare |
| 2020/0163496 A1 | 5/2020 | Tojek et al. |
| 2020/0292366 A1 | 9/2020 | Ophardt et al. |
| 2020/0337506 A1 | 10/2020 | Marshall |
| 2023/0210316 A1* | 7/2023 | Crismann ................ A47K 5/12 222/401 |
| 2023/0389755 A1* | 12/2023 | Butler ...................... A47K 5/12 |

FOREIGN PATENT DOCUMENTS

| | | |
|---|---|---|
| EP | 1444049 B1 | 8/2007 |
| EP | 1706011 B1 | 12/2008 |
| EP | 1702547 B1 | 8/2009 |
| EP | 2370327 B1 | 4/2013 |
| EP | 2370045 B1 | 1/2014 |
| EP | 2328690 B1 | 1/2015 |
| EP | 2299885 B1 | 7/2015 |
| EP | 2376346 B3 | 1/2016 |
| EP | 2669214 B1 | 1/2016 |
| EP | 2669215 B1 | 1/2016 |
| EP | 2283194 B1 | 2/2016 |
| EP | 2322068 B1 | 4/2016 |
| EP | 2277423 B1 | 5/2016 |
| EP | 2729701 B1 | 8/2016 |
| EP | 2855029 B1 | 12/2016 |
| EP | 2908956 B1 | 5/2017 |
| EP | 2566377 B1 | 1/2018 |
| EP | 2896340 B1 | 5/2018 |
| EP | 3359006 A1 | 8/2018 |
| EP | 2502677 B1 | 12/2018 |
| EP | 2914384 B1 | 1/2019 |
| EP | 2948255 B1 | 1/2019 |
| EP | 2888056 B1 | 2/2019 |
| EP | 2846925 B1 | 3/2019 |
| EP | 2669016 B1 | 4/2019 |
| EP | 2844118 B1 | 4/2019 |
| EP | 2967262 B1 | 4/2019 |
| EP | 3245924 B1 | 4/2019 |
| EP | 3331409 B1 | 7/2019 |
| EP | 2223642 B1 | 9/2019 |
| EP | 3533368 A1 | 9/2019 |
| EP | 3556472 A1 | 10/2019 |
| EP | 2520910 B1 | 12/2019 |
| EP | 3488937 B1 | 7/2020 |
| EP | 3370590 B1 | 9/2020 |
| EP | 3711645 A1 | 9/2020 |
| EP | 3448215 B1 | 11/2020 |
| EP | 3520662 B1 | 11/2020 |
| EP | 3738491 A1 | 11/2020 |
| EP | 3738492 A1 | 11/2020 |
| KR | 20200049177 A | 5/2020 |
| WO | 02/049490 A1 | 6/2002 |
| WO | 2006114662 A1 | 11/2006 |
| WO | 2017062325 A1 | 4/2017 |
| WO | 2017077269 A1 | 5/2017 |

\* cited by examiner

DISPENSER SYSTEM

CROSS-REFERENCE TO RELATED APPLICATIONS

The present application is a divisional application of U.S. application Ser. No. 17/496,192, filed on Oct. 7, 2021, which is incorporated by reference herein in its entirety.

BACKGROUND

Field of the Disclosure

The present disclosure relates to a dispenser system for dispensing a fluid comprising a dispenser and an adaptor configured to cooperate with the dispenser to support a cartridge containing fluid.

Description of the Background of the Disclosure

Dispensers are used in a wide variety of different environments, ranging from public bathrooms to office blocks, hotels, hospitals, restaurants, and other public or private establishments. Generally, dispensers consist of a dispenser housing and a refillable and/or replaceable reservoir containing the fluid product to be dispensed (e.g., a cartridge).

Depending on the location, the dispenser will likely be required to dispense a particular type of fluid product, such as, e.g., soap, sanitizing solution, shampoo, etc. Furthermore, it is important that the fluid product dispensed is of a required quality and/or grade. This is particularly important where hygiene is of high importance, such as, e.g., in a hospital setting, where it is important that only the expected fluid is dispensed from the dispenser.

To this end, dispensers may be configured to operate exclusively with cartridges containing the particular fluid desired, which often results in the dispenser having complex mechanisms with multiple components for preventing use of the dispenser with the wrong type of cartridge, i.e., an incompatible cartridge.

However, manufacturing a corresponding dispenser tailored for use exclusively with a particular cartridge type is costly and requires a large product range.

Furthermore, different grades or types of fluid products may be desired, which can require the replacement of the entire dispenser with a new dispenser that is compatible with the new cartridge, or replacement of mechanisms within the dispenser, both of which are costly and inefficient.

It is an aim of the present disclosure to address or mitigate at least some of these problems.

SUMMARY

In one aspect, an adaptor includes a central biased region including a central flex axis, a first distal biased region that is connected to the central biased region, and a second distal biased region that is connected to the central biased region. The first distal biased region includes a first distal flex axis and the second distal biased region includes a second distal flex axis. The first distal biased region and the second distal biased region are configured to be at least partially rotated about the central flex axis.

In some embodiments, the first distal biased region and the second distal biased region are configured to provide an identical range of rotation. In some aspects, the central biased region is configured to provide a different range of rotation than the second distal biased region. In some embodiments, the central biased region defines a first resistance, the first distal biased region defines a second resistance, and the first resistance is different from the second resistance. In some aspects, the central biased region is configured to allow a first pair of retention projections to move relative to each other.

In some aspects, the first pair of retention projections are spaced apart from the central biased region a first distance and spaced apart from each other a second distance. The first distance may be different from the second distance. In some embodiments, the second distance is configured to be increased by rotation of at least one of the pair of retention projections about the central flex axis.

In some embodiments, the first distal biased region is connected to the central biased region by a first leg, the second distal biased region is connected to the central biased region by a second leg, and a first catch is positioned on the first leg and a second catch is positioned on the second leg. In some aspects, the adaptor is a single, unitary device.

In another aspect, a dispenser includes a dispenser body that includes an interior cavity in which a first chassis is configured to be translated relative to a second chassis. Further, the dispenser includes an adaptor that has a central portion disposed between a first leg and a second leg. In some embodiments, the adaptor is configured to be received within a first chassis, and the adaptor includes a central flex axis that extends in a direction that is parallel with a direction in which the first chassis is configured to be translated.

In some aspects, the first chassis is configured to be translated in a vertical direction. In some embodiments, the first leg and the second leg each extend from opposing sides of the central portion. In some aspects, the adaptor is configured to be received within a U-shaped slot of the first chassis. In some embodiments, the first leg and the second leg are each configured to be rotated about the central flex axis. In some aspects, the central portion includes a first bias that is configured to resist movement of the first leg and the second leg about the central flex axis. In some embodiments, the adaptor is configured to be coupled to a pump drive flange of a cartridge containing a fluid to be dispensed.

In yet another aspect, a dispenser includes a dispenser body that has an interior cavity in which a first chassis is configured to be translated relative to a second chassis along a central axis. Further, the dispenser has a cartridge including a container and a pump that includes a drive flange defining a drive diameter. In addition, the dispenser includes an adaptor having a pair of legs that are configured to be coupled to the drive flange and the first chassis, and the adaptor and the drive flange are configured to prevent the drive flange from being translated independently of each other.

In some embodiments, the first leg of the adaptor includes first and second retention projections, the second retention projection being configured to contact the drive flange and the first retention projection being configured to contact the first chassis. In some aspects, the drive flange defines a diameter, the adaptor defines a retention width, and the diameter is configured to correspond to the retention width to achieve a snap-fit between the adaptor and the drive flange.

In some embodiments, an actuator is configured to be depressed to cause translation of the first chassis, the adaptor, and the drive flange in a first direction, at least one spring is configured to translate the first chassis, the adaptor, and the drive flange in a second direction opposite to the first direction, and the actuator is configured to be depressed in a third direction that is different from the first and second directions.

In still another aspect, a method of providing a dispenser for dispensing a fluid includes the provision of a dispenser body and the provision of a first adaptor that is configured to couple a first cartridge to the dispenser body. The first adaptor defines a first dimension that corresponds to a portion of the first cartridge. Further, the method includes the provision of a second adaptor that is configured to couple a second cartridge to the dispenser body. The second adaptor defines a second dimension that corresponds to a portion of the second cartridge. In some embodiments, the first dimension is different from the second dimension, and the first adaptor and the second adaptor are configured to be flexible.

In some embodiments, the first adaptor and the second adaptor are substantially identical to each other except for the first and second dimensions. In some aspects, the first cartridge and the second cartridge are different with respect to at least one of a pump, a cartridge body, and a fluid to be dispensed. In some embodiments, the first dimension of the first adaptor does not correspond to the portion of the second cartridge and the second dimension of the second adaptor does not correspond to the portion of the first cartridge.

In some aspects, when the first adaptor is operably received within the dispenser body, the first cartridge is capable of dispensing a fluid. In some embodiments, only one of the first adaptor and the second adaptor can be operably received within the dispenser body. In some aspects, the dispenser body includes a front cover that is rotatably mounted to a back body about a first hinge axis and the front cover includes an actuator that is rotatable about a second hinge axis that is spaced apart from the first hinge axis.

In some embodiments, the actuator is configured to contact a moving chassis within the dispenser body when the front cover is mounted to the back body in a closed position. In some aspects, in the closed position, when the actuator rotates about the second hinge axis, the moving chassis translates within the dispenser body. In some embodiments, in the closed position, when the actuator rotates about the second hinge axis, the first adaptor or the second adaptor, translates with the moving chassis.

In another aspect, a dispenser system comprising a dispenser for dispensing a fluid is provided, the dispenser system comprising a dispenser body at least partially defining an interior of the dispenser which is configured to house a cartridge containing fluid to be dispensed. Further, the dispenser system includes a moving chassis that is configured for movement with respect to the body and an adaptor configured to be removably coupled to the moving chassis to form a support structure for supporting a cartridge of a predetermined type in the dispenser. To that end, the adaptor cooperates with the moving chassis of the dispenser to form a support structure for supporting a cartridge in the dispenser. Accordingly, a dispenser having a single moving chassis design can be adapted for use with a desired cartridge type by use of the adaptor. Accordingly, for a variety of cartridge types corresponding to a variety of fluid products, a single dispenser and moving chassis design can be used and adapted to be compatible with a particular cartridge type by the use of a corresponding adaptor. As a result, the dispenser is efficiently manufactured, cost effective, and consolidates a quantity of parts, while being capable of use with a variety of cartridge types.

In some embodiments, the adaptor and moving chassis are coupled together to form a support structure for supporting a particular cartridge type to maintain the integrity of the dispenser, such that users receive the expected fluid during use. In addition, when a cartridge becomes depleted, a full cartridge of identical type can replace the depleted cartridge for operable use within the dispenser. As such, the adaptor and the moving chassis are compatible with cartridge types and/or particular cartridges.

Furthermore, in the event that the dispenser is required to dispense a different type of fluid, the adaptor can be replaced with an alternative adaptor configured to support a different type of cartridge without the need to replace the entire moving chassis or dispenser. Accordingly, the dispenser can be reconfigured to operate with a different type of cartridge if required, and such reconfiguration can be carried out in place. Further, in the event of lost or damaged parts, the adaptor can be replaced without requiring replacement of the moving chassis or dispenser. This results in a versatile dispenser system of simple construction that can be reconfigured efficiently by maintenance professionals, which is more cost effective and less wasteful.

It will be appreciated that, by supporting the cartridge with the support structure, the cartridge is coupled to the moving chassis such that at least a portion of the cartridge is secured for movement with the moving chassis. The adaptor and the moving chassis are coupled together such that movement of the moving chassis with respect to the body causes movement of the adaptor with respect to the body. When a cartridge is supported by the support structure, movement of the moving chassis therefore causes corresponding movement of the cartridge.

In some embodiments, both the moving chassis and adaptor must be present in the dispenser to support the cartridge of a predetermined type in the dispenser for dispensing. To that end, the moving chassis and the adaptor cooperate to support the cartridge of a predetermined type. Without either component, the support structure is not formed and the cartridge of a predetermined type cannot be supported in the dispenser for dispensing.

In some embodiments, the adaptor is configured to be removably coupled to the moving chassis such that movement of the moving chassis is translated directly into movement of the adaptor throughout an entire range of movement of the moving chassis. To that end, there is no lost motion between the moving chassis and the adaptor. In some embodiments, the moving chassis is configured for vertical movement when in normal use. In some embodiments, the moving chassis is not configured to be removed from the dispenser. In some embodiments, the moving chassis is configured to be permanently coupled to the dispenser body.

In some embodiments, the support structure defines an opening for receipt of said cartridge. In some embodiments, the adaptor is configured to flex in a direction toward and away from said opening. In some embodiments, the adaptor is configured to flex toward and away from an opening defined by the support structure that is configured for receipt of the cartridge. In this way, the adaptor is configured to flex toward and away from the cartridge when in use, thereby facilitating location of the cartridge in the support structure to effectively load the cartridge in the body. This provides a simple and effective way of loading the cartridge in the dispenser housing, while keeping the number of moving parts and overall component numbers comprising the support structure to a minimum. For example, since the adaptor is configured to flex, additional springs are not required, thereby reducing the number of components as well as the amount of metal required to construct the dispenser system.

In some embodiments, the adaptor is configured to flex relative to the moving chassis, when the adaptor is coupled to the moving chassis. In other words, from the frame of reference of the moving chassis, the adaptor is configured to flex when it is coupled to the moving chassis. The fluid may comprise a soap, shampoo, hand sanitizer, lotion, cleaning agent or other desired fluid. As used herein, the term "soap" is intended to include any liquid detergent or cleaning product suitable for being dispensed from a fluid dispenser.

In some embodiments, the support structure is configured to exclusively support a cartridge of a predetermined type. Accordingly, the dispenser system can be used exclusively with the correct cartridge type, ensuring that the fluid being dispensed is as required and expected.

In some embodiments, the adaptor is configured for snap-fit engagement with the cartridge. In some embodiments, the support structure is configured for snap-fit engagement with the cartridge. In this way, a simple and easy means of supporting the cartridge in the dispenser is provided. It will be appreciated that the snap-fit functionality of the adaptor with the cartridge is facilitated by the adaptor being configured to flex in a direction toward and away from the opening of the support structure.

In some embodiments, the adaptor comprises a catch element for engaging a corresponding portion of said cartridge. In this way, the corresponding portion of the cartridge is coupled to the support structure for movement with the moving chassis. In some embodiments, the catch element is biased toward engagement with said cartridge. This provides a simple and effective means of retaining the cartridge in place. In other words, the cartridge is more effectively coupled to the support structure.

In some embodiments, the adaptor comprises at least one resilient leg extending from a central portion, wherein the leg is configured to flex about the central portion. In some embodiments, the adaptor comprises a pair of resilient legs configured to flex about the central portion. Accordingly, the resilient leg facilitates flexing of the adaptor in a direction toward and away from the opening of the support structure. This provides an adaptor with a simple structure which is configured to flex. In some embodiments, the resilient leg comprises the catch element.

In some embodiments, the adaptor comprises a pair of legs arranged symmetrically about the central portion. In some embodiments, each of the pair of legs comprises a catch element. Accordingly, the resilient legs are configured to flex toward and away from an axis of symmetry of the adaptor such that the catch elements are therefore arranged to move toward and away from the axis of symmetry.

When a cartridge is loaded in the dispenser and the adaptor is coupled to the moving chassis, the pair of legs, and hence the catch elements provided thereon, are configured to flex in a direction toward and away from the opening of the support structure, i.e., toward and away from the cartridge, e.g., a longitudinal axis of the cartridge. By providing opposing catch elements in this way, effective retention of the cartridge in place can be achieved. In some embodiments, a pair of catch elements are provided, for example diametrically opposite each other with respect to the axis of symmetry of the adaptor and/or opening of the support structure. Accordingly, the pair of catch elements can act to grip a portion of the cartridge to retain it in place.

In some embodiments, the catch element comprises a projection, projecting toward the axis of symmetry of the adaptor. In some embodiments, where a pair of catch elements are provided, the catch elements comprise projections configured to extend toward each other. In some embodiments, at least a portion of the leg comprises a bow shaped profile to facilitate flexing of the adaptor. Accordingly, the profile of the adaptor is formed to facilitate the flexing capability of the adaptor, such that no additional springs or components are required. This reduces the number of components required in the dispenser system and also reduces the amount of metal required to manufacture the dispenser. The bow shaped profile also facilitates snap-fit engagement of the catch with the cartridge. In some embodiments, the support structure comprises a retention arrangement for coupling the adaptor to the moving chassis. Accordingly, the adaptor and moving chassis are reliably coupled together.

In some embodiments, the retention arrangement comprises a snap-fit arrangement. In some embodiments, the retention arrangement is biased toward coupling of the adaptor and the moving chassis. Accordingly, a simple and effective way of coupling the adaptor and the moving chassis is provided. In some embodiments, the adaptor comprises a resiliently biased structure comprising a retention element for coupling to a corresponding retention element of the moving chassis, wherein the retention element of the adaptor and the corresponding retention element of the moving chassis comprise the retention arrangement.

In some embodiments, the retention arrangement comprises a projection and corresponding aperture. For example, the retention element of the adaptor may comprise a projection and the corresponding retention element of the moving chassis may comprise an aperture, or vice versa. In some embodiments, the retention element of the adaptor is provided at a free end of the resilient leg. In some embodiments, a retention element of the adaptor is provided at a free end of each resilient leg.

In some embodiments, the moving chassis and adaptor comprise a location arrangement for locating the adaptor in the correct position with respect to the moving chassis. Accordingly, correct positioning of the adaptor with respect to the moving chassis can be achieved. This facilitates correct location of the cartridge in the dispenser. In some embodiments, the location arrangement comprises a projection and corresponding aperture or recess. For example, the adaptor may comprise the projection and the moving chassis may comprise the aperture or recess, or vice versa.

In some embodiments, the moving chassis comprises a cavity for receipt of the adaptor. In some embodiments, the location arrangement comprises a locating element of the adaptor and a corresponding locating element of the cavity. In some embodiments, the locating element of the adaptor is provided by the central portion of the adaptor. This facilitates effective location of the adaptor with respect to the moving chassis.

In some embodiments, the location arrangement comprises a projection and corresponding aperture or recess. For example, the locating element of the adaptor may comprise a projection and the corresponding locating element of the cavity may comprise an aperture or recess, or vice versa. In some embodiments, the adaptor is configured to be operatively coupled to the moving chassis such that the adaptor is secured for movement with the moving chassis, and the adaptor is configured to engage a portion of the cartridge, such that movement of the moving chassis is translated directly into movement of the portion of the cartridge throughout an entire range of movement of the moving chassis.

In some embodiments, the moving chassis and adaptor are configured to move together such that a portion of the cartridge which is supported by the moving chassis and adaptor moves together with the moving chassis and adaptor. In some embodiments, the cartridge is supported by the moving chassis and adaptor such that movement of the moving chassis is translated into movement of the portion of the cartridge throughout an entire range of movement of the moving chassis. Accordingly, there is no loss of motion between the portion of the cartridge and the moving chassis. This results in a consistent dose of fluid being dispensed from the dispenser.

In some embodiments, the adaptor comprises a single component. Accordingly, a dispenser system with a simple construction is provided. Furthermore, should the dispenser system need to be used with a different type of cartridge, this can be achieved simply by replacing a single component, i.e., the adaptor, for an adaptor corresponding to the desired cartridge type. This reduces the parts required for manufacture of the dispenser system in the first instance, and also reduces the number of parts that need to be replaced should a dispenser need to be reconfigured for use with a different cartridge type. This is more cost efficient and reduces waste.

In some embodiments, the adaptor is formed of a plastic material. This facilitates the resilient nature of the adaptor and also reduces the amount of metal required to produce the dispenser system. In some embodiments, the adaptor is a first adaptor configured to be removably coupled to the moving chassis to form a support structure for supporting a first cartridge in the dispenser, and the dispenser system further comprises a second adaptor configured to be removably coupled to the moving chassis to form a support structure for supporting a second cartridge, different to the first cartridge, in the dispenser, wherein the first adaptor and second adaptor are arranged to be interchangeably coupled to the moving chassis.

In a further aspect, a dispenser assembly is provided comprising a dispenser system as disclosed herein and a cartridge containing fluid to be dispensed. In some embodiments, the cartridge further comprises a pump configured to dispense fluid from the cartridge, the pump comprising a movable component (e.g., comprising a piston) which is configured to be supported by the support structure for movement with the moving chassis.

In some embodiments, the cartridge comprises a pump having a movable component and a fixed component configured such that movement of the movable component with respect to the fixed component generates a pumping action to dispense fluid from the cartridge. By supporting the movable component of the cartridge in the support structure, the movable component is coupled for movement with the moving chassis, such that the pump action of the cartridge pump is achieved and fluid dispensed from the cartridge.

In some embodiments, the cartridge comprises a fixed portion (e.g., comprising a cylinder of the pump) wherein the dispenser system is configured to retain the fixed portion of said cartridge against movement with respect to the dispenser housing. In some embodiments, the dispenser itself retains the fixed portion of the cartridge against movement. For example, the cartridge may comprise a cartridge body located in the dispenser body, wherein the dispenser body itself (e.g., an outer wall of the dispenser body) prevents movement of the cartridge body with respect to the body.

In some embodiments, the fixed portion comprises a fixed portion of the cartridge pump. In some embodiments, the dispenser system (e.g., the support structure) comprises a static component configured to retain the fixed portion of the cartridge against movement with respect to the dispenser body. In some embodiments, the static component is integral with the dispenser body.

In some embodiments, the cartridge and dispenser system (e.g., the support structure) comprise complimentary guide formations, such that the cartridge can only be loaded in the dispenser in a predetermined orientation. Accordingly, incorrect loading of the cartridge in the dispenser housing is prevented or inhibited.

In a further aspect, a dispenser includes a body defining an interior of the dispenser which is configured to house a cartridge containing a fluid to be dispensed. Further, the dispenser includes a moving chassis configured for movement with respect to the dispenser body, a first adaptor configured to be removably coupled to the moving chassis to form a support structure for supporting a first cartridge in the dispenser, and a second adaptor configured to be removably coupled to the moving chassis to form a support structure for supporting a second cartridge, different to the first cartridge, in the dispenser. The first adaptor and second adaptor are arranged to be interchangeably coupled to the moving chassis. To that end, the moving chassis is arranged to cooperate with both the first adaptor and the second adaptor, interchangeably. The first adaptor, which is configured for operation with a first cartridge, can be replaced with the second adaptor, which is configured for operation with a first cartridge, without needing the entire moving chassis or dispenser to be replaced, and vice versa.

Each of the first and second adaptors co-operates with the moving chassis of the dispenser to form a respective support structure for supporting a respective type of cartridge in the dispenser. Accordingly, a dispenser having a single moving chassis design can be adapted for use with a desired cartridge type via use of the adaptor. Consequently, for a given range of cartridges, e.g., corresponding to a given range of fluid products, a single dispenser and moving chassis design can be used and adapted to be compatible with a particular cartridge via a corresponding adaptor. This is simple to manufacture, more cost effective, and less wasteful.

The dispenser system can be easily re-configured to operate with a different type of cartridge if required. For example, it may be that the first cartridge comprises a first fluid type and the second cartridge comprises a second fluid type. This results in a versatile dispenser system of simple construction that can be easily re-configured to operate with different cartridges with minimal changes to the system, which is more cost effective and less wasteful. Furthermore, use of the first and second adaptors ensures that only corresponding cartridges can be used with the dispenser, ensuring that the quality, grade, and/or type of fluid dispensed is as required.

In some embodiments, the first adaptor comprises a first retention element for coupling the first adaptor to the moving chassis and the second adaptor comprises a second retention element for coupling the second adaptor to the moving chassis, wherein the moving chassis comprises a corresponding retention element which corresponds to the first retention element of the first adaptor and which also corresponds to the second retention element of the second adaptor, such that the first retention element and the second retention element are arranged to be interchangeably coupled to the corresponding retention element of the moving chassis. To that end, the moving chassis comprises a single retention element structure, which corresponds to both the first retention element of the first adaptor and also the second retention element of the second adaptor, such that the moving chassis is compatible with both the first and second adaptors. In other words, only a single design of moving chassis is required that is compatible with both the first and second adaptor retention elements.

In some embodiments, the moving chassis comprises a cavity for receipt of the first and/or second adaptor, wherein the first adaptor and second adaptor are arranged to be interchangeably located in the cavity. To that end, the cavity of the moving chassis is configured to cooperate with both the first and second adaptors, such that a single design of moving chassis can be used with both the first and second adaptors.

In some embodiments, the first adaptor comprises a first catch element for engaging a corresponding portion of said first cartridge, the second adaptor comprises a second catch element for engaging a corresponding portion of said second cartridge, and the first catch element of the first adaptor and the second catch element of the second adaptor are different. To that end, the first adaptor comprises a catch element that is configured to engage a first cartridge and the second adaptor comprises a catch element that is configured to engage a second cartridge. The catch elements of the first adaptor and the second adaptor are different such that they are configured to support different types of cartridge. This allows the dispenser system to support different cartridge types simply by changing the adaptor which is coupled to the moving chassis. This means that a single dispenser body and moving chassis design can be used to house a range of cartridge types. Only a corresponding adaptor will be required which is compatible with the desired cartridge type. Accordingly, a versatile dispenser system is provided which reduces manufacturing requirements and also reduces cost and waste of materials.

In some embodiments, 2, 3, 4, 5, 6, 7, 8, 9, 10, 11, or 12 cartridge types may be included in a particular product range, for example, corresponding to different fluids. Accordingly, a corresponding number of adaptors can be provided. It will be appreciated that any number of cartridge types, configurations, or sizes may be included in a given product range and that corresponding adaptors can be provided for each cartridge type. In some embodiments, cartridges of the different types may include the same fluid but differing fluid volumes.

In some embodiments, the dispenser system comprises one or more additional adaptors configured to be removably coupled to the moving chassis to form a corresponding support structure for supporting a respective cartridge, wherein the first, second, and one or more additional adaptors are arranged to be interchangeably coupled to the moving chassis.

In a further aspect, a dispenser assembly is provided comprising a dispenser system as disclosed herein, a first cartridge containing a fluid to be dispensed and a second cartridge containing a fluid to be dispensed. In some embodiments, the first and second cartridges each comprise a pump configured to dispense fluid from the respective cartridge, the pump comprising a movable component (e.g., a piston) which is configured to be supported by the respective support structure for movement with the moving chassis.

In some embodiments, the first and second cartridges each further comprise a fixed portion (e.g., a cylinder of the pump) wherein the dispenser system is configured to retain the fixed portion of said respective cartridge against movement with respect to the dispenser housing. In some embodiments, the first and second cartridges and the dispenser system (e.g., the respective support structure) comprise complimentary guide formations, such that the first and second cartridge can only be loaded in the dispenser in a predetermined orientation.

In some embodiments, the support structure for a respective cartridge is configured to support a first portion of the cartridge for movement with the moving chassis, and the dispenser system is configured to retain a second portion of the cartridge against movement with respect to the dispenser housing. In some embodiments, the first portion comprises the moveable component of a pump coupled to the cartridge. In some embodiments, the second portion comprises a body of the cartridge. In some embodiments, the second portion comprises a fixed portion of the pump.

In some embodiments, the dispenser system comprises a static component that is configured to retain the second portion of the cartridge against movement with respect to the dispenser housing, wherein the moving chassis is biased away from the static component. In some embodiments, the dispenser itself retains the second portion of the cartridge against movement. For example, the cartridge may comprise a cartridge body located in the dispenser body, wherein the dispenser body itself (e.g., an outer wall of the dispenser body) prevents movement of the cartridge body with respect to the body.

In some embodiments, the fixed portion comprises a fixed portion of the cartridge pump. In some embodiments, the dispenser system (e.g., the support structure) comprises a static component configured to retain the fixed portion of the cartridge against movement with respect to the dispenser body. In some embodiments, the static component is integral with the dispenser body. Accordingly, the total number of components required to manufacture the dispenser system is kept to a minimum. In some embodiments, the moving chassis is provided by a single component. Accordingly, the total number of components required to manufacture the dispenser system is kept to a minimum.

In some embodiments, the dispenser comprises an actuator operatively coupled to the moving chassis, such that in use, fluid is dispensed from the dispenser upon actuation of the actuator. In some embodiments, the moving chassis is configured for movement in a first direction with respect to the dispenser body, and the actuator is configured for movement in a second direction, different to the first direction.

For example, the actuator may be a push button configured to actuate movement of the moving chassis up on the application of a force by a user. Alternatively, the dispenser actuator may be a sensor arrangement, such as a proximity sensor, configured to actuate the dispenser once a user comes within a predetermined distance of the sensor. It will be appreciated that any suitable actuator may be used.

In another aspect, an assembly includes a cartridge containing fluid to be dispensed and an adaptor configured to be removably coupled to a dispenser to form a support structure for supporting the cartridge in said dispenser. In some embodiments, the adaptor is configured to flex to facilitate coupling of the adaptor to the cartridge.

In still another aspect, an adaptor is provided for use with a dispenser for dispensing fluid and a cartridge containing a fluid to be dispensed, wherein the adaptor is configured to be removably coupled to the dispenser to form a support structure for supporting said cartridge in the dispenser. In some embodiments, the adaptor is configured to flex to facilitate coupling of the adaptor to said cartridge.

In another aspect, a dispenser includes a body defining an interior of the dispenser that is configured to house a cartridge containing fluid to be dispensed. Further, the dispenser includes a moving chassis configured for movement with respect to the dispenser body. The moving chassis is configured to be removably coupled to an adaptor to form a support structure for supporting a first portion of a cartridge in the dispenser.

In some embodiments, the dispenser is configured such that movement of the moving chassis is translated directly into movement of the first portion of the cartridge throughout an entire range of movement of the moving chassis.

It will be appreciated that the features described herein may apply to any aspect disclosed herein. All combinations contemplated are not recited explicitly for the sake of brevity.

BRIEF DESCRIPTION OF THE DRAWINGS

Embodiments will now be described, by way of example only and with reference to the accompanying drawings, in which.

DETAILED DESCRIPTION

The present disclosure is directed to a dispenser assembly for dispensing fluid. The dispenser assembly includes a dispenser housing and a fluid cartridge. While the embodiments of the present disclosure may take many different forms, several embodiments are discussed herein with the understanding that the present disclosure is to be considered as exemplary, and it is not intended to limit the invention to the embodiments illustrated.

Further, the fluid discussed herein may comprise a soap, shampoo, hand sanitizer, lotion, cleaning agent or other desired fluid. Further, the term "fluid" as used herein is intended to include both viscous and non-viscous fluids, as well as fluids of pure concentrate, mixtures, chemicals, naturally occurring fluids, and any other fluid capable of being dispensed. As used herein, the term "soap" is intended to include any liquid detergent or cleaning product suitable for being dispensed from a fluid dispenser. Additives may be included in the fluid and/or soap, such as, for example, fragrances, preservatives, moisturizers, dyes, and particulates, among others.

Figure 1:
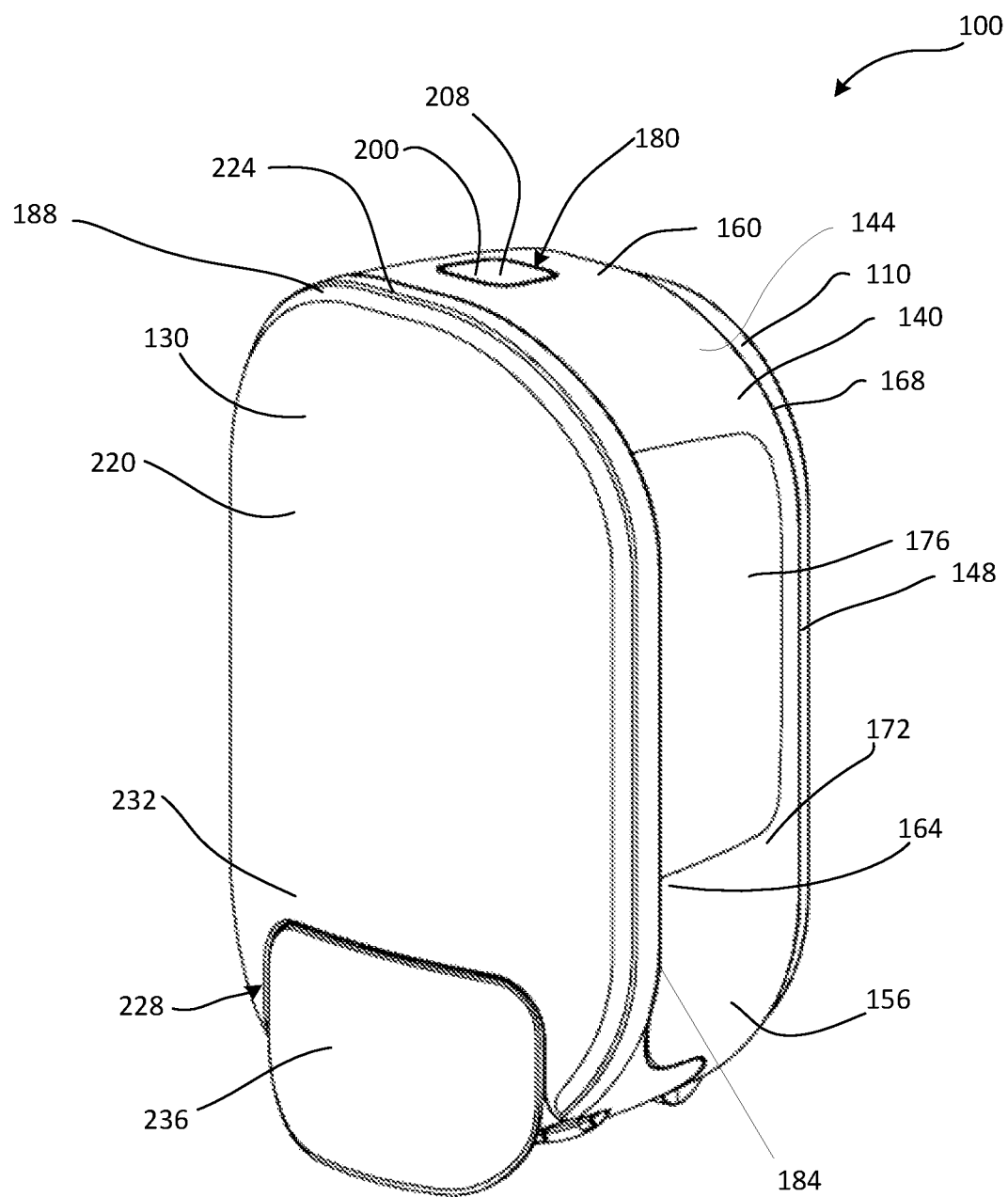
FIG. 1 is a perspective view of an embodiment of a dispenser assembly when in a closed position.
Figure 2:
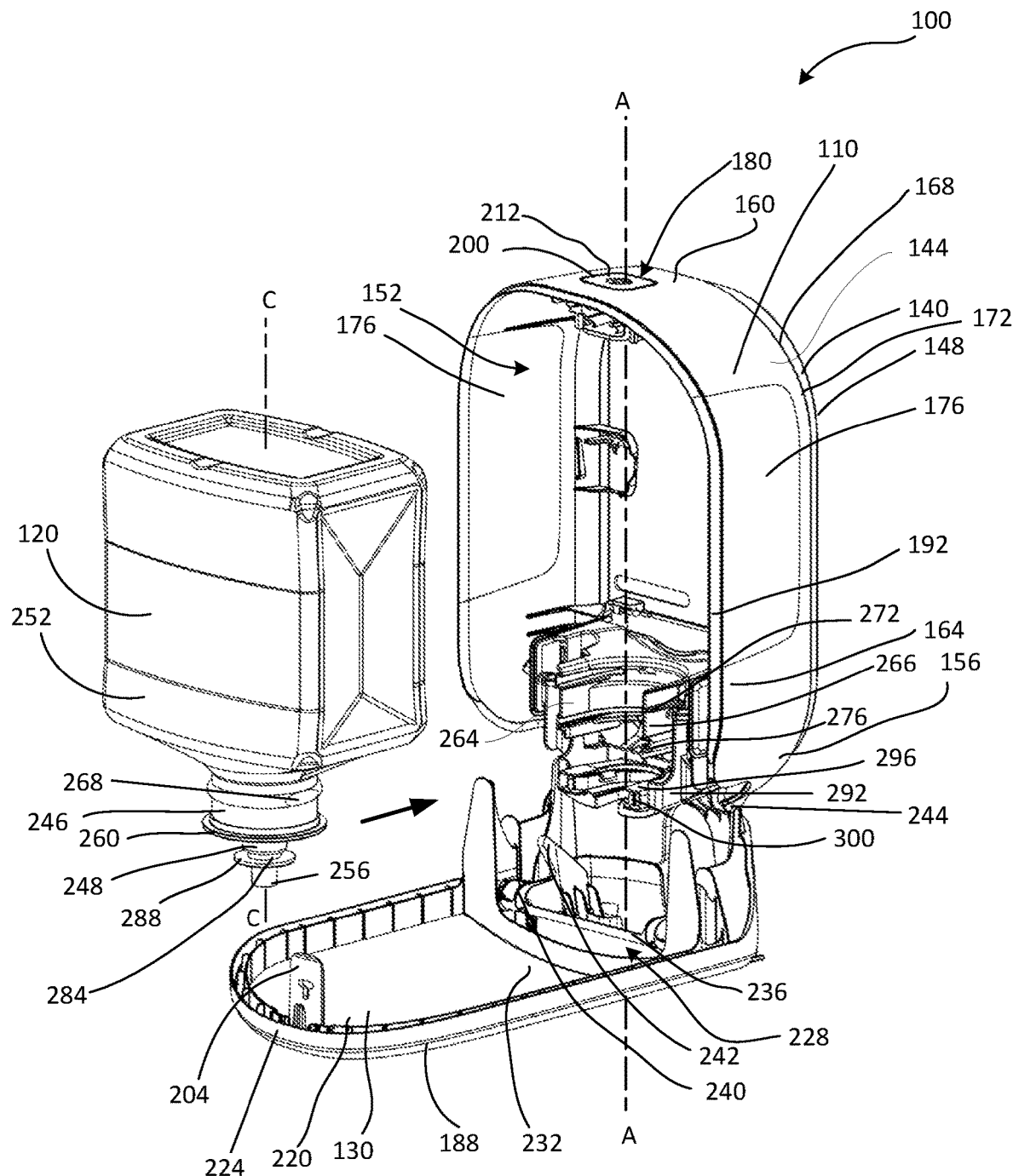
FIG. 2 is a perspective view of the dispenser assembly of FIG. 1 when in an open position and with a cartridge being depicted in a pre-loaded state.

Referring to the drawings, FIGS. 1 and 2 illustrate a dispenser assembly 100 including a dispenser 110 for accommodating a refill or cartridge 120. The dispenser 110 is configured for dispensing a fluid. The fluid may comprise a soap, shampoo, hand sanitizer, lotion, cleaning agent or other desired fluid.

As illustrated in FIGS. 1 and 2, the dispenser 110 is configured to contain and operably engage the cartridge 120 containing fluid to be dispensed. In the illustrated embodiment, the cartridge 120 is a bottle type container, but other types of cartridges are included within the scope of this disclosure, such as, e.g., bags, liners, rigid and non-rigid containers, and thin-walled and thick-walled containers, among others.

As illustrated in FIGS. 1 and 2, the dispenser 110 includes a cover or front panel 130 and a body 140 that includes a sidewall 144 extending from a backplate 148 to at least partially define an interior cavity 152 of the dispenser 110. The body 140 includes a bottom end 156 that is opposite a top end 160, a front end 164 that is opposite a rear end 168, and opposing sides 172. In the illustrated embodiment, the front panel 130 is disposed at the front end 164, the backplate 148 is disposed at the rear end 168, and the sidewall 144 extends between the front end 164 and the rear end 168. In some implementations, the sidewall 144 is provided as being translucent and transparent windows 176 are arranged on the opposing sides 172, although other configurations are possible.

In one instance, the front panel 130 and the body 140 are movable relative to each other between an open position (see FIG. 2), where the interior cavity 152 is exposed and/or uncovered, and a closed position (see FIG. 1), where the interior cavity 152 of the dispenser 110 is covered and/or concealed. In the closed position, the front panel 130 spans across the front end 164, from the top end 160 to the bottom end 156. Further, the sidewall 144 of the body 140 extends continuously from the top end 160 to the bottom end 156 in a generally U-shape, and an opening 180 is located at the top end 160 approximately centrally between the front and rear ends 164, 168 and between the opposing sides 172. In the illustrated embodiment, the backplate 148 and the sidewall 144 are integrally formed as a single component. However, it will be appreciated that the backplate 148 and the sidewall 144 may be provided as separate components and, further, that the sidewall 144 may be provided as multiple portions or sections coupled together.

Referring to FIG. 1, the front panel 130 and the body 140 mate together along at least a portion of a periphery 184 formed between a perimeter 188 of the front panel 130 and a peripheral edge 192 (see FIG. 2) of the sidewall 144, thereby causing a snug fit therebetween. In some embodiments, a gasket (not shown) of elastomeric material, or any other suitable material, may be positioned between the front panel 130 and the body 140 to prevent egress or ingress of liquids, gases, sounds, or optical emissions. The gasket may be carried by the front panel 130 and/or the body 140.

As illustrated in FIGS. 1 and 2, a lock or release device 200 is disposed within the opening 180 at the top end 160 of the body 140 and a latch or locking tongue 204 is carried by the front panel 130. FIG. 1 illustrates the release device 200 in a first configuration in which a button wall 208 is exposed at the sidewall 144. FIG. 2 illustrates the release device 200 in a second configuration in which a key wall 212 is exposed at the sidewall 144 for use with a unique key (not shown). Together, the release device 200 and the locking tongue 204 comprise at least part of a locking mechanism that is configured to releasably secure the front panel 130 to the body 140 in the closed position.

With continued reference to FIGS. 1 and 2, the front panel 130 includes a front wall 220 that spans across the perimeter 188. The perimeter 188 of the front panel 130 includes a peak 224 that is located centrally thereon and at an uppermost point opposite a notch 228 formed at a lower section 232. A trigger or actuator 236 is configured to be pivotably coupled to the front panel 130 and mounted within the notch 228 substantially flush with the front wall 220 and the perimeter 188 in the lower section 232. In the illustrated embodiment, the actuator 236 is coupled to the front panel 130 in the lower section 232 by an actuator hinge 240 from which lever arms 242 (see FIG. 2) protrude vertically upwardly and outwardly for operable engagement with the body 140, as will be described in more detail further below.

In the illustrated embodiment, the front panel 130 and the body 140 are pivotable or rotatable about an access hinge 244 at the bottom end 156 of the body 140 to expose the interior cavity 152 and to permit access thereto. The actuator hinge 240 is spaced apart from the bottom end 156 and, thus, the actuator hinge 240 is spaced apart from the access hinge 244 about which the body 140 and the front panel 130 are pivotable or rotatable. Additionally or alternatively, the front panel 130 and the body 140 may be completely detachable from each other without the use of the hinge. In some embodiments, the front panel 130 may be adapted to slide relative to the body 140 to expose or cover the interior cavity 152, or the front panel 130 may rotate in a different direction than shown.

An example of the cartridge 120 which can be loaded into the dispenser 110 is shown in FIG. 2. The cartridge 120 includes an open mouth (not shown) defined by a neck 246 through which fluid leaves the cartridge 120. The cartridge 120 may be formed as any suitable container, for example, a bottle type container, although other configurations are possible. The cartridge 120 also includes a pump 248 mounted within the open mouth (not shown) of the neck 246 and configured to apply a suction force within a cartridge body 252 for pumping fluid therefrom, ultimately being pumped through a nozzle 256 to a user's hands positioned below the dispenser 110. Further, the pump 248 includes a housing flange 260 that is secured to the neck 246 of the cartridge 120 and protrudes outwardly therefrom. The cartridge 120 defines a central axis C extending generally vertically and axially through the neck 246 and the cartridge body 252, as shown in FIG. 2. In the illustrated embodiment, the nozzle 256 and the pump 248 are axially aligned with the central axis C, although other configurations are possible.

Still referring to FIG. 2, a support structure 264 of the dispenser 110 includes collar 266 carried by the body 140 and arranged to retain the housing flange 260 of the cartridge 120 against movement with respect to the dispenser 110. The cartridge 120 and the support structure 264 include complimentary guide formations arranged such that the cartridge 120 is loaded in the dispenser 110 in one or more predetermined orientations. In one implementation, the neck 246 of the cartridge 120 is provided with a pair of flat portions 268 and the dispenser 110 includes a corresponding pair of guide projections 272. The flat portions 268 of the cartridge 120 and the corresponding guide projections 272 of the dispenser 110 cooperate such that the cartridge 120 is inserted into the dispenser 110 in one of two orientations. In the illustrated embodiment, the guide projections 272 are provided by the collar 266 of the body 140, although other configurations are possible.

Figure 3:
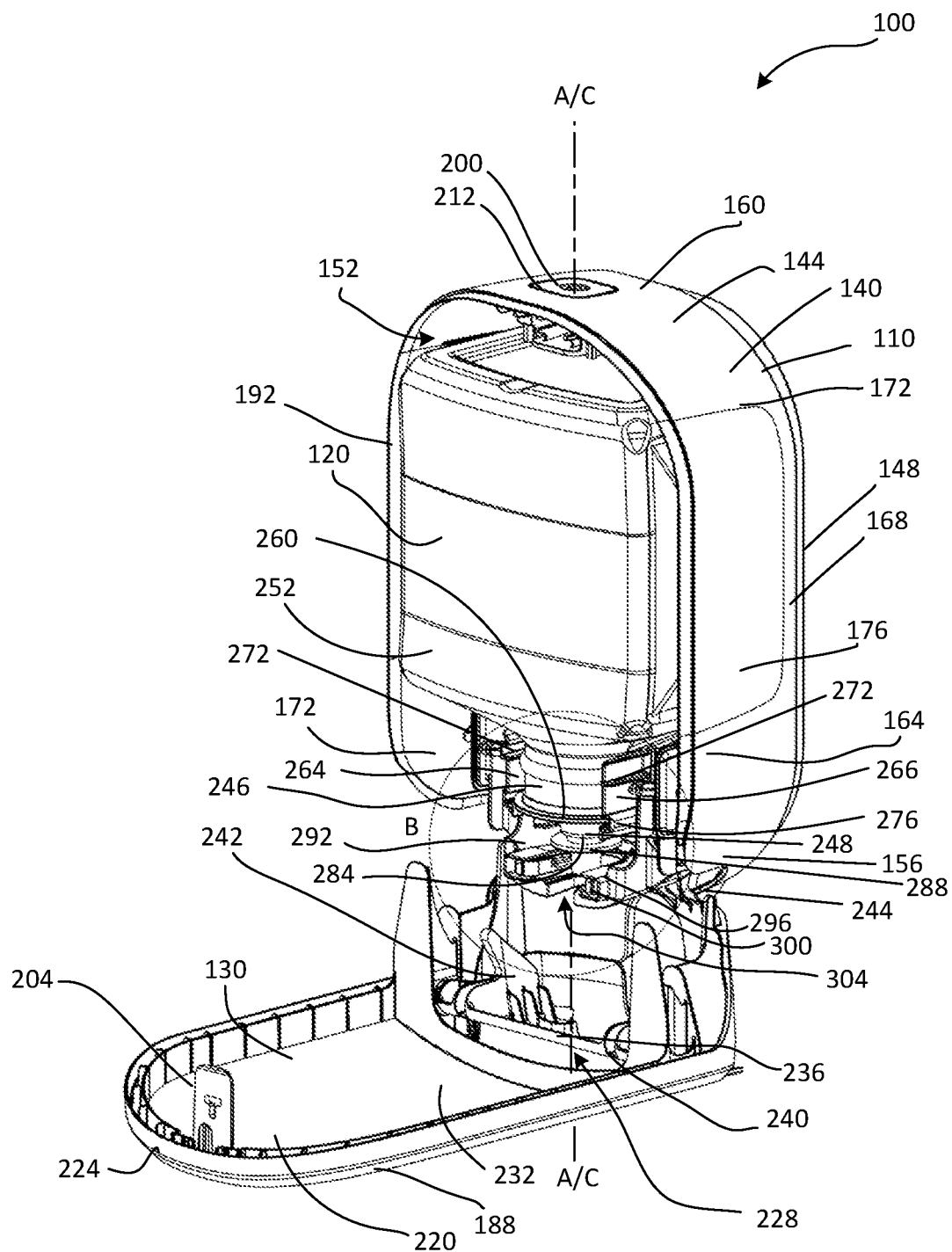
FIG. 3 shows a perspective view of the dispenser assembly of FIG. 1 when in the open position and with the cartridge of FIG. 2 being depicted in a loaded state.
Figure 4:
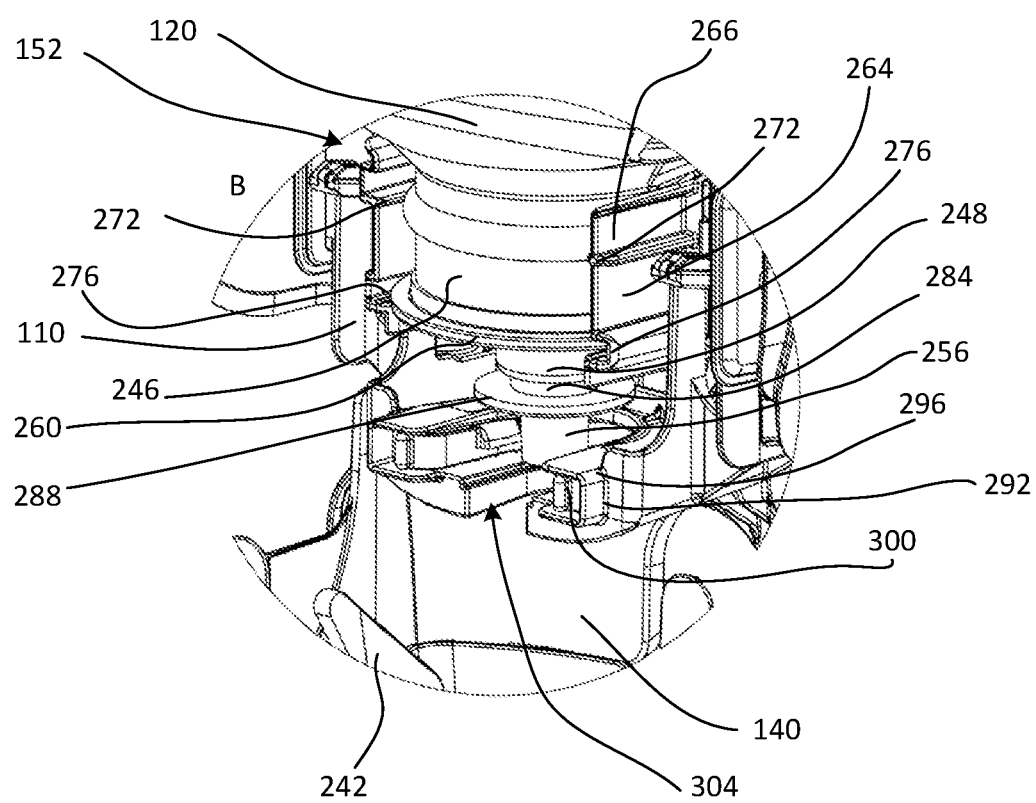
FIG. 4 is an enlarged view of the region B of the dispenser assembly and the cartridge of FIG. 3.

FIGS. 3 and 4 illustrate the cartridge 120 being received by the support structure 264 of the body 140 of the dispenser 110 when the cartridge 120 is moved into the interior cavity 152 of the body 140, as indicated by the directional arrow of FIG. 2. As best seen in FIG. 4, the housing flange 260 of the pump 248 is received within a corresponding pair of guide tracks 276 formed by the collar 266 and positioned below the guide projections 272. When the cartridge 120 is received in any of the predetermined orientations, the housing flange 260 is arranged to slide within the guide tracks 276 and to prevent vertical translation of the cartridge 120 relative to the dispenser 110. As such, the housing flange 260 has a predetermined diameter D1 and thickness T1 (see FIG. 11) corresponding with the dimensions of the guide tracks 276. Further, the housing flange 260 is configured to abut the neck 246 of the cartridge 120 to form a seal therebetween, thereby preventing fluid or air from escaping.

Referring again to FIG. 2, the pump 248 is provided with a pump housing (not shown) that is coupled within the neck 246 of the cartridge 120 and a valve 284 that is movable within the pump housing (not shown). In the illustrated embodiment, the valve 284 carries a drive flange 288 configured to move in relation to the housing flange 260 and, in particular, the drive flange 288 moves vertically and concentrically with respect to the housing flange 260. The drive flange 288 has a predetermined diameter D2 and thickness T2 (see FIG. 11) corresponding with the dimensions of the support structure 264 of the dispenser 110 for compatible operation therewith, which will be further described below. However, it will be appreciated that any suitable pump construction may be used to dispense fluid from the cartridge 120. Further, the pump 248 may be provided as a foam-type, a liquid-type, or any other suitable type of pump for dispensing a fluid-like product for consumption.

It will be appreciated that the cartridge 120 is intended to be representative of various types and versions that may be used with the dispenser 110. Such types or versions of cartridges 120 may differ in particular dimensions, i.e., the diameter D1 and thickness T1 of the housing flange 260 or the diameter D2 and thickness T2 of the drive flange 288 (see FIG. 11), which correspond to particular compatibility features of the dispenser 110. Further, the types or versions of cartridges 120 may vary with respect to the fluid contained therein, the type of pump 248 used, the materials and/or construction of the cartridge body 252, or in other aspects.

In the illustrated embodiment of FIGS. 2-4 and 11-13, the drive flange 288 and the housing flange 260 are generally circular, although other configurations are possible. For example, the drive flange 288 and/or the housing flange 260 may instead be provided in the form of rectangular tabs (not shown) or, alternatively, the drive flange 288 and/or the housing flange 260 may be provided in a rectangular shape, or a triangular shape, or trapezoidal shape, or an irregular shape, or any other suitable shape capable of having corresponding dimensions to the support structure 264 of the dispenser assembly 100. In addition, the pump 248 may be removably coupled to the neck 246 of the cartridge 120 to be reusable with multiple cartridges 120 or, alternatively, the pump 248 may be permanently or semi-permanently coupled to the neck 246 of the cartridge 120 and intended for use with one cartridge 120. In the illustrated embodiment, the pump 248 is coaxial with the central axis C and extends substantially vertically through and outwardly from the neck 246 of the cartridge 120, but other arrangements are possible. For example, the valve 284 and drive flange 288 may extend outwardly from the neck 246 of the cartridge 120 at an angle relative to the central axis C.

With reference to FIGS. 3 and 4, the support structure 264 further includes a drive unit 292 having a moving chassis 296 that is arranged for vertical translation within the interior cavity 152. Further, the drive unit 292 includes an adaptor 300 that is configured to be removably received within the moving chassis 296, such that the moving chassis 296 and adaptor 300 together are configured to receive and operably engage a predetermined cartridge type in the dispenser 110. In one instance, the moving chassis 296 is provided as a separate component to the dispenser 110 and the collar 266 is integral with the dispenser 110, but other configurations are possible. The adaptor 300 is configured to have dimensions that correspond to the drive flange 288 for enabling compatible operation therewith, as will be further described below.

Still referring to FIGS. 3 and 4, the moving chassis 296 of the drive unit 292 defines a receptacle 304 configured for receiving an operable component, e.g., the drive flange 288, of the cartridge 120, where the operable component corresponds to the cartridge type. In the illustrated embodiment, the receptacle 304 is configured for receiving the drive flange 288 carried by and operably connected with the pump 248 of the cartridge 120 to dispense fluid. As illustrated in FIG. 2, the drive unit 292 defines a drive axis A that is centrally located in the receptacle 304 and extends vertically through the body 140 of the dispenser 110. When the cartridge 120 is located in the dispenser 110, the drive flange 288 of the cartridge 120 occupies the receptacle 304 of the support structure 264 and, as a result, the drive axis A of the dispenser 110 is coaxial with the central axis C of the cartridge 120, as best seen in FIG. 3. Further, the moving chassis 296 is configured to be translated in a vertical direction, i.e., along the drive axis A, relative to the collar 266, such as, e.g., by actuation of the dispenser 110 to dispense fluid.

Figure 5:
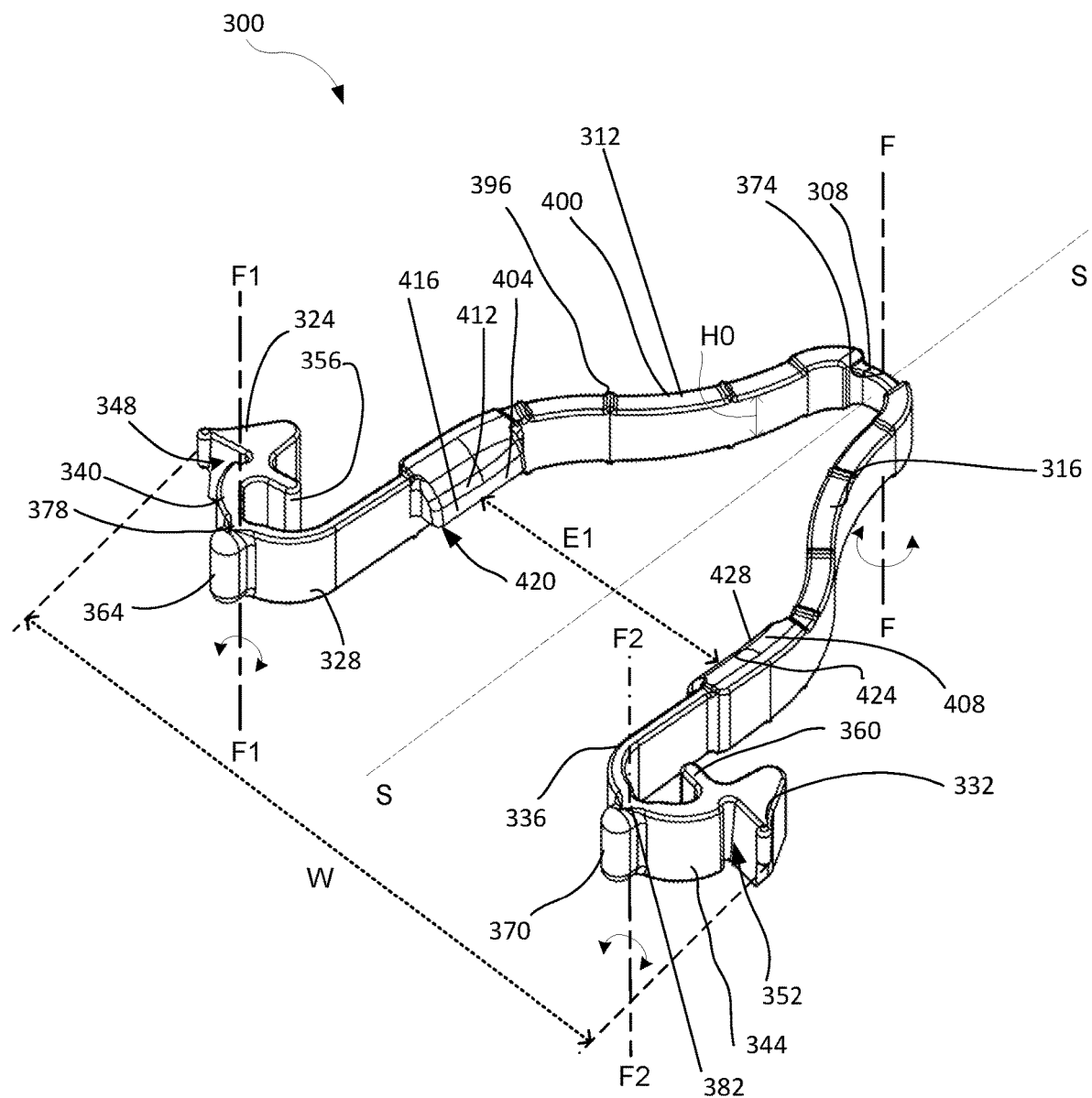
FIG. 5 is a perspective view of a first adaptor of the dispenser assembly of FIG. 1.
Figure 6:
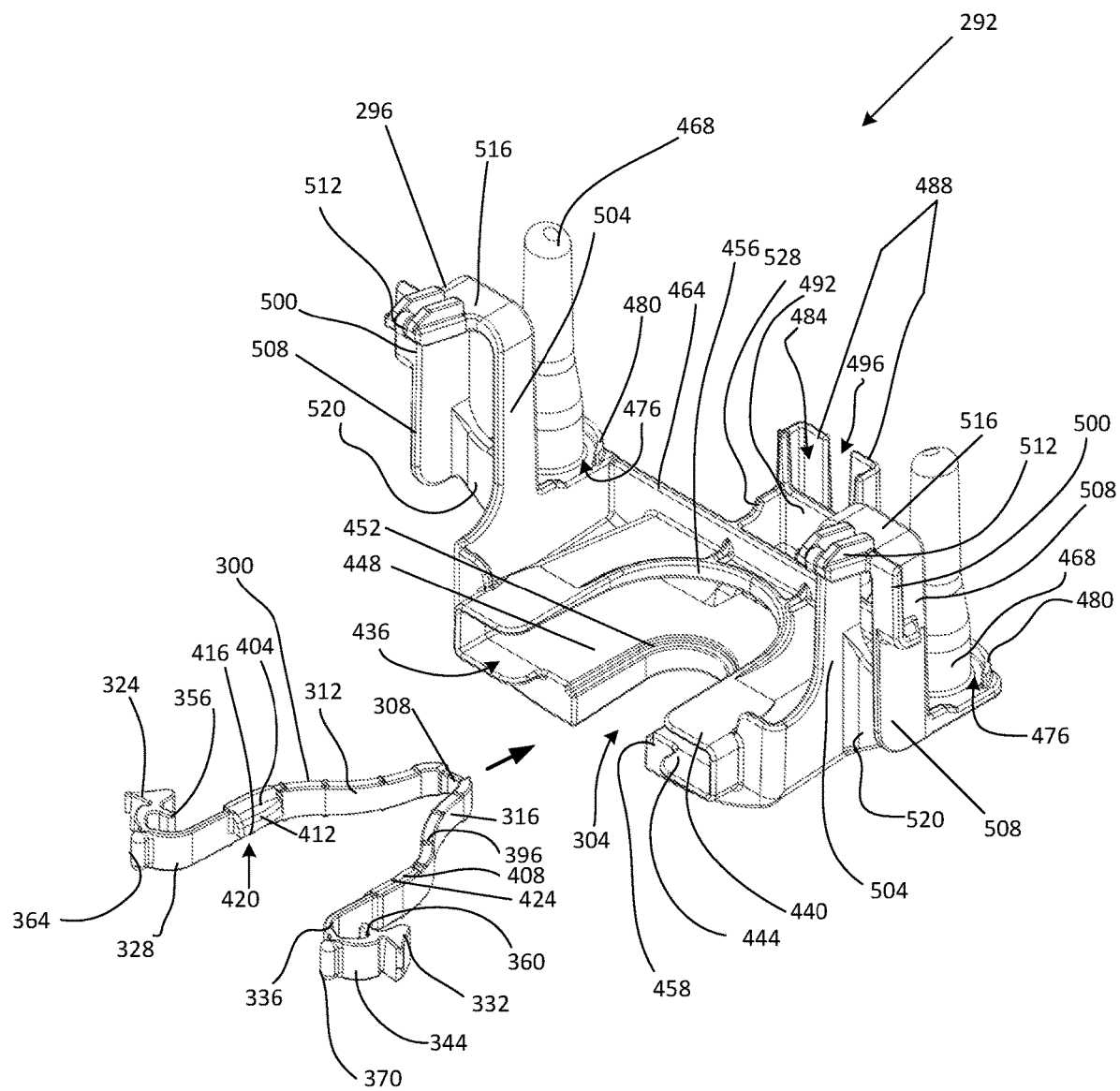
FIG. 6 is a perspective view of the first adaptor and a moving chassis of the dispenser assembly of FIG. 1, the first adaptor being depicted in a pre-installation state.

With reference to FIGS. 5 and 6, the adaptor 300 includes a joint or central portion 308 that connects a first leg 312 to a second leg 316, both of which extend outwardly from opposite sides of the central portion 308. In the illustrated embodiment, the adaptor 300 is symmetrical about a longitudinal axis S that is centrally disposed between the first leg 312 and the second leg 316 and intersects the central portion 308. However, in other embodiments, the adaptor 300 may be asymmetrical or may be symmetrical about a different axis. The first leg 312 and the second leg 316 are capable of being rotated about the central portion 308, causing the central portion 308 to bend or flex. In some implementations, the first leg 312 and the second leg 316 also bend or flex when being rotated about the central portion 308. As shown in FIG. 5, a central flex axis F is defined by the central portion 308 and extends vertically, perpendicularly to the longitudinal axis S. Each of the first leg 312 and the second leg 316 is configured to be displaced (e.g., rotated) about the central flex axis F. In one instance, each of the first leg 312 and the second leg 316 is rotated both inwardly, i.e., toward each other, and outwardly, i.e., away from each other, about the flex axis F, as indicated by the bi-directional arrows.

Referring to FIG. 5, the first leg 312 includes a first latch 324 at a first distal end 328 that is opposite the central portion 308 and the second leg 316 includes a second latch 332 at a second distal end 336 that is opposite central portion 308, the first latch 324 and the second latch 332 being provided for retention of the adaptor 300 within the moving chassis 296. The first latch 324 and the second latch 332 may be individually referred to as retention projections or elements and collectively referred to as a first pair of retention projections or elements. Each of the first latch 324 and the second latch 332 is generally triangular-shaped and extends from a first curved arm 340 and a second curved arm 344, respectively, connected to the respective first distal end 328 of the first leg 312 and the second distal end 336 of the second leg 316. In addition, the first distal end 328 and the second distal end 336 of the adaptor 300 are also provided as curved sections. The first latch 324 protrudes laterally outwardly, i.e., away from the longitudinal axis S, from the first curved arm 340 and a first crevice 348 is defined therebetween. Similarly, the second latch 332 protrudes laterally outwardly, i.e., away from longitudinal axis S, from the second curved arm 344 and a second crevice 352 is defined therebetween.

Still referring to FIG. 5, a first rib 356 extends laterally inwardly, i.e., toward the longitudinal axis S, from the first latch 324 toward the first leg 312 for preventing the first latch 324 from becoming excessively displaced (e.g., rotated). Similarly, a second rib 360 extends laterally inwardly, e.g., toward the longitudinal axis S, from the second latch 332 toward the second leg 316 for preventing the second latch 332 from becoming excessively displaced (e.g., rotated). Moreover, a first tab 364 extends longitudinally outwardly, i.e., parallel to the longitudinal axis S, from the first curved arm 340 and a second tab 370 extends longitudinally outwardly, i.e., parallel to the longitudinal axis S, from the second curved arm 344 to provide surfaces for bi-directional manipulation, such as by a user's fingers and/or thumb. In some embodiments, a range of rotation about the first distal flex axis F1 and a range of rotation about the second distal flex axis F2 are equal. However, a range of rotation about the central flex axis F is greater than the range of rotation of either the first distal flex axis F1 and the second distal flex axis F2.

Figure 8:
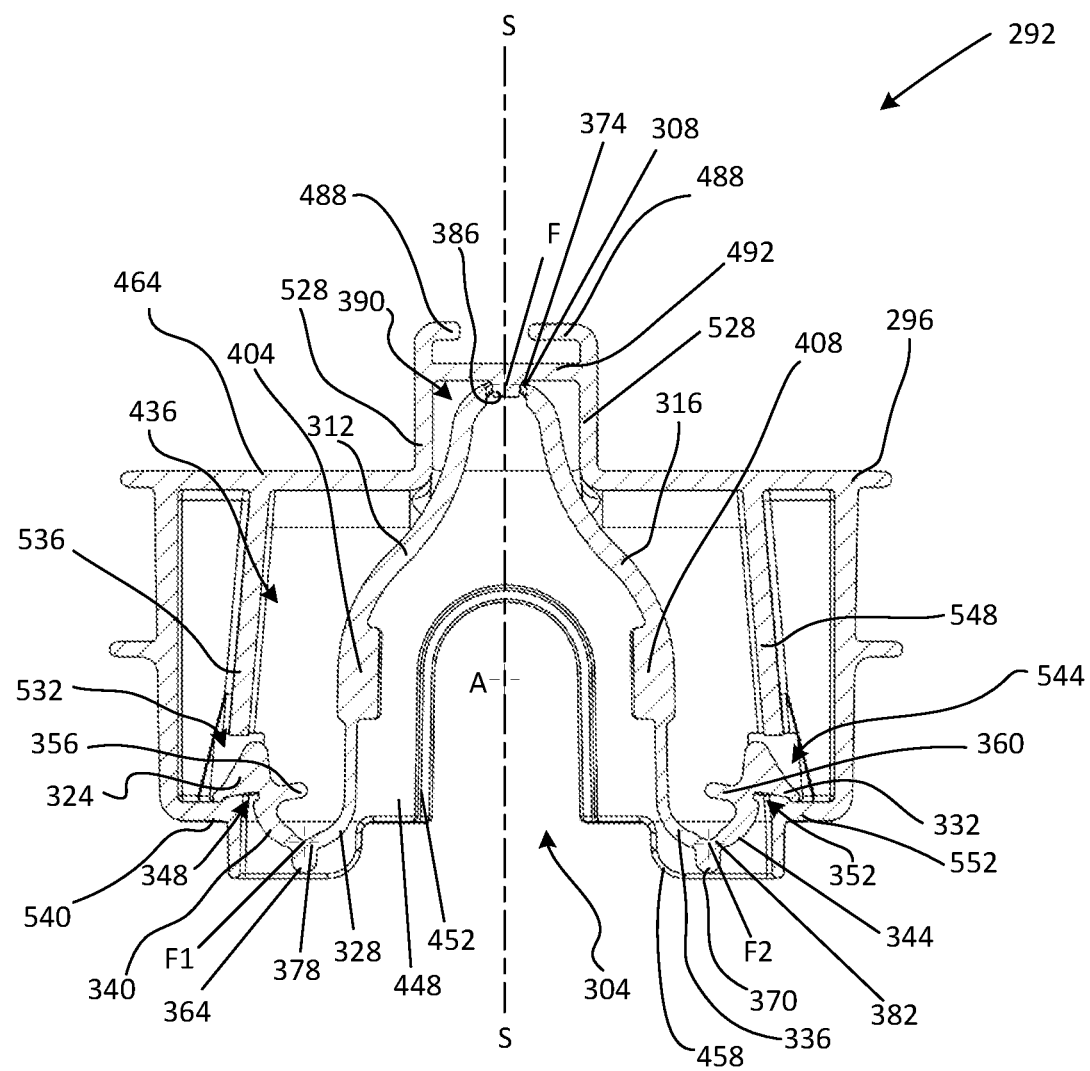
FIG. 8 is a cross-sectional plan view of the first adaptor and the moving chassis of the dispenser assembly taken along the line 8-8 of FIG. 7.

It will be appreciated that the first latch 324 and the second latch 332 are configured to be displaced relative to the central portion 308 by way of translation and rotation, e.g., bending or flexing, about the central flex axis F. Further, the first latch 324 is capable of being displaced (e.g., rotated) about a first distal flex axis F1 that is defined between the first curved arm 340 and the first distal end 328 and extends vertically, perpendicularly to the longitudinal axis S. Similarly, the second latch 332 is capable of being displaced (e.g., rotated) about a second distal flex axis F2 that is defined between the second curved arm 344 and the second distal end 336 and extends vertically, perpendicularly to the longitudinal axis S. As shown in FIGS. 5 and 8, the first latch 324 and the second latch 332 are spaced equidistant from the central portion 308, although other configurations are possible. Further, the first latch 324 and the second latch 332 are spaced apart from each other a distance W, which is greater than the distance that either the first latch 324 or the second latch 332 is spaced from the central portion 308.

In the illustrated embodiment, the first latch 324 and the second latch 332 are capable of being displaced both inwardly, i.e., toward each other, and outwardly, i.e., away from each other, about the central flex axis F by displacement (e.g., rotation) of the first leg 312 and the second leg 316, respectively. Further, the first latch 324 is capable of being rotated both inwardly, i.e., toward the longitudinal axis S, and outwardly, i.e., away from the longitudinal axis S, about the first distal flex axis F1. Still further, the second latch 332 is also capable of being rotated both inwardly, i.e., toward the longitudinal axis S, and outwardly, i.e., away from the longitudinal axis S, about the second distal flex axis F2. Accordingly, displacement of the first latch 324 can occur as a result of its dependency on the first leg 312, such that when the first leg 312 is displaced about the central flex axis F and/or the central portion 308, the first latch 324 is also displaced. Thus, a position of the first latch 324 is a function of a position of the first leg 312 relative to the longitudinal axis S and/or the second leg 316. Further, displacement of the second latch 332 can occur as a result of its dependency on the second leg 316, such that when the second leg 316 is displaced about the central flex axis F and/or the central portion 308, the second latch 332 is also displaced. Thus, a position of the second latch 332 is a function of a position of the second leg 316 relative to the longitudinal axis S and/or the first leg 312. In addition, the distance W between the first latch 324 and the second latch 332 is a function of the position of the first leg 312 and the second leg 316 relative to the central portion 308 and the central flex axis F, such that rotation can increase or decrease the distance W between the first latch 324 and the second latch 332. In a similar fashion, rotation of the first latch 324 about the first curved arm 340 and the first distal flex axis F1, as well as rotation of the second latch 332 about the second curved arm 344 and the second distal flex axis F2, can increase or decrease the distance between the first latch 324 and the second latch 332.

In addition, the first latch 324 is capable of being displaced independently of the first leg 312 and independently of the central flex axis F. That is, independent displacement of the first latch 324 can occur about the first distal flex axis F1, without effect to the position of the first leg 312 and the second leg 316. In addition, the second latch 332 is capable of being displaced independently of the second leg 316 and independently of the central flex axis F. That is, independent displacement of the second latch 332 can occur about the second distal flex axis F2, without effect to the position of the second leg 316 and the first leg 312. It will also be appreciated that the first latch 324 and the second latch 332 can be displaced independently of each other about the first distal flex axis F1 and second distal flex axis F2, respectively.

In the illustrated embodiment of FIG. 5, the first latch 324 and the second latch 332 are positioned rearward of the first curved arm 340 and the second curved arm 344, while the first leg 312 including the first latch 324 and the second leg 316 including the second latch 332 are positioned forward of the central portion 308. Further, the first curved arm 340 and the second curved arm 344 are each curved in the rearward direction opposite to the forward direction in which the central portion 308 curves. As a result of these relative positions and curvatures, clockwise and counterclockwise rotation of the first latch 324 about the first curved arm 340, i.e., the first distal flex axis F1, causes displacement to occur in an opposite direction as compared to the central portion 308, i.e., the central flex axis F. Similarly, clockwise and counterclockwise rotation of the second latch 332 about the second curved arm 344, i.e., the second distal flex axis F2, causes displacement to occur in an opposite direction as compared to the central portion 308, i.e., the central flex axis F. For example, clockwise rotation of the first latch 324 about the first distal flex axis F1 causes laterally inward displacement of the first latch 324, but clockwise rotation of the first latch 324 by way of the first leg 312 about the central portion 308 and/or central flex axis F causes laterally outward displacement of the first latch 324. In a similar manner, clockwise rotation of the second latch 332 about the second distal flex axis F2 causes laterally outward displacement of the second latch 332, but clockwise rotation of the second latch 332 by way of the first leg 312 about the central flex axis F causes laterally inward displacement of the first latch 324. It will be appreciated that the inverse is true of counterclockwise rotation of the first latch 324 relative to each of the central portion 308 and/or the central flex axis F and the first curved arm 340 and/or first distal flex axis F1 and, further, of counterclockwise rotation of the second latch 332 relative to each of the central portion 308 and/or the central flex axis F and the second curved arm 344 and/or second distal flex axis F2.

FIG. 5 depicts a rest position of the adaptor 300. By way of the arcuate or curved shape of the central portion 308, as well as the materials, thickness, and dimensions thereof, the central portion 308 defines a central biased region 374 that imparts a resistance against displacement (e.g., rotation) of each of the first leg 312 and the second leg 316 from the rest position, thereby causing springback to occur upon displacement in any direction therefrom. Accordingly, that resistance must be overcome for each of the first leg 312 and the second leg 316 to be displaced (e.g., rotated) about the central flex axis F, whether being rotated laterally inwardly or laterally outwardly. In this way, each of the first leg 312 and the second leg 316 is configured to spring or snap back into the rest position from a displaced position by the central portion 308 and, in particular, by the resistance imparted to each of the first leg 312 and the second leg 316 from the central biased region 374 of the central portion 308. Further, the central biased region 374 is configured to allow the first latch 324 and the second latch 332, i.e., the first pair of projections, to move relative to each other by way of the first leg 312 and the second leg 316.

Further, by way of the arcuate or curved shape of the first curved arm 340 and the first distal end 328, as well as the materials, thickness, and dimensions thereof, a first distal biased region 378 is formed by the first curved arm 340 and the first distal end 328. The first distal biased region 378 is intersected by the first distal flex axis F1 and imparts a resistance against displacement (e.g., rotation) of the first latch 324 from the rest position about the first distal flex axis F1, thereby causing springback to occur upon displacement in any direction therefrom. Accordingly, that resistance must be overcome for the first latch 324 to be displaced (e.g., rotated) about the first distal flex axis F1, whether being rotated laterally inwardly or laterally outwardly. Accordingly, the first latch 324 is configured to spring or snap back into the rest position from a displaced position by the first curved arm 340 and, in particular, by the resistance imparted to the first latch 324 from the first distal biased region 378 of the first curved arm 340 during displacement. As will be appreciated from FIG. 5, the first distal biased region 378 is connected to the central biased region 374 by the first leg 312 and can be displaced (e.g., rotated) about the central flex axis F by way of the first leg 312. In this manner, the first distal biased region 378, including the first distal flex axis F1, can be rotated about the central flex axis F and/or the central biased region 374.

In a similar fashion, by way of the arcuate or curved shape of the second curved arm 344 and the second distal end 336, as well as the materials, thickness, and dimensions thereof, a second distal biased region 382 is formed by the second curved arm 344 and the second distal end 336. The second distal biased region 382 is intersected by the second distal flex axis F2 and imparts a resistance against displacement (e.g., rotation) of the second latch 332 from the rest position, thereby causing springback to occur upon displacement in any direction therefrom. Accordingly, that resistance must be overcome for the second latch 332 to be displaced (e.g., rotated) about the second distal flex axis F2, whether being rotated laterally inwardly or laterally outwardly. Accordingly, the second latch 332 is configured to spring or snap back into the rest position from a displaced position by the second curved arm 344 and, in particular, by the resistance imparted to the second latch 332 from the second distal biased region 382 of the second curved arm 344 during displacement. As will be appreciated from FIG. 5, the second distal biased region 382 is connected to the central biased region 374 by the second leg 316 and can be displaced (e.g., rotated) about the central flex axis F by way of the second leg 316. In this manner, the second distal biased region 382, including the second distal flex axis F2, can be rotated about the central flex axis F and/or the central biased region 374.

It is contemplated that the central biased region 374 imparts a first resistance that is different than a second resistance imparted by the first distal biased region 378 and a third resistance imparted by the second distal biased region 382 or, alternatively, that the central biased region 374 may impart an equal magnitude of resistance as imparted by the first distal biased region 378 and/or the second distal biased region 382. It is further contemplated that the first distal biased region 378 and the second distal biased region 382 impart equal magnitudes of resistance, although in some cases the second resistance of the first biased region 378 is different from the third resistance of the second distal biased region 382 without departing from the scope of this disclosure. Further, a first range of rotation allowed by the central biased region 374 may be greater than a second range of rotation allowed by the first distal biased region 378 and a third range of rotation allowed by the second distal biased region 382. In some embodiments, range of rotation is proportional to resistance, such that greater resistance results in lower range of rotation. In this way, different resistances can be related to different ranges of rotation.

Still referring to FIG. 5, the adaptor 300 defines a height H0 that varies therealong. In one instance, the height H0 is identical along the first leg 312 and the second leg 316 but smaller at the central portion 308. In particular, the reduced height H0 of the adaptor 300 at the central portion 308 is provided for engagement with a locator 386 that extends from the moving chassis 296 into a pocket 390 that is configured to receive the central portion 308, as seen in FIG. 8. In the embodiment of FIG. 5, the first leg 312 and the second leg 316 each include a plurality of protrusions 396 extending therefrom, which may be spaced apart from each other and positioned along one or more surfaces of the first leg 312 and the second leg 316, respectively. In the illustrated embodiment, the plurality of protrusions 396 are disposed on a top surface 400 and a bottom surface (not shown) of each of the first leg 312 and the second leg 316, although other configurations are possible.

Staying with FIG. 5, the adaptor 300 comprises a first catch 404 provided on the first leg 312 and a second catch 408 provided on the second leg 316 for retention of the drive flange 288. The first catch 404 and the second catch 408 may be individually referred to as retention projections or elements and collectively referred to as a second pair of retention projections or elements. Further, it will be appreciated that the first leg 312 includes the first latch 324 and the first catch 404, otherwise referred to as the first set of retention projections or elements, and the second leg 316 includes the second latch 332 and the second catch 408, otherwise referred to as the second set of retention projections or elements. In the illustrated embodiment, the first catch 404 and the second catch 408 are spaced equidistant from the central portion 308 and between the central portion 308 and the first distal end 328 and the second distal end 336, respectively, of the first leg 312 and the second leg 316, respectively. Referring to the adaptor 300 of FIG. 5, the first catch 404 and the second catch 408 each extend laterally inwardly toward each other to define a predetermined dimension or distance E1, which is a retention width. In one instance, the first catch 404 includes a first ramp 412 that extends to a first tip 416 and a first channel 420 is defined underneath the first catch 404 between the first leg 312 and the first tip 416. Similarly, the second catch 408 includes a second ramp 424 that extends to a second tip 428 and a second channel 432 (see FIG. 7) that is defined underneath the second catch 408 between the second leg 316 and the second tip 428. The first ramp 412 and the second ramp 424 each extend downwardly and laterally inwardly from the top surface 400 of the adaptor 300 to the first tip 416 and the second tip 428, respectively. Further, the first catch 404 and the second catch 408 are arranged on the adaptor 300 to define a channel height EE1 (see FIG. 11) that is less than the height H0 of the adaptor 300.

Figure 11:
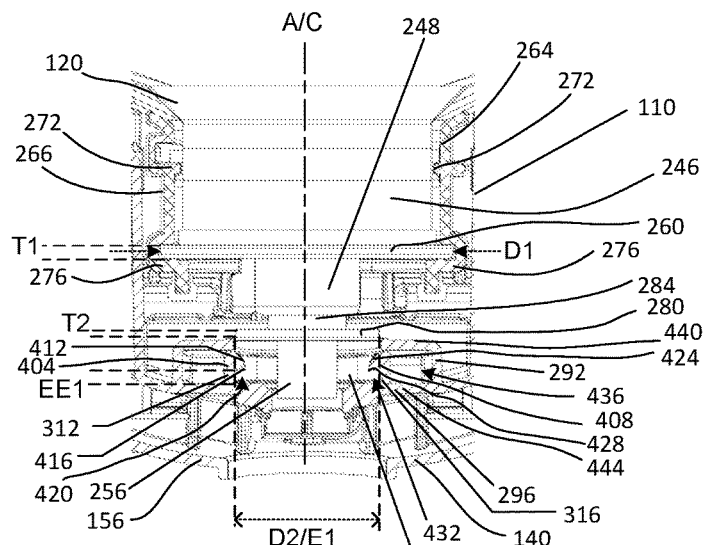
FIGS. 11-13 show cross sectional views of the operation of a cartridge pump of the dispenser assembly of FIG. 1.

With respect to the adaptor 300 of FIG. 5, the predetermined distance E1 is measured between the first leg 312 within the first channel 420 of the first catch 404 and the second leg 316 within the second channel 432 of the second catch 408 (see FIG. 11). In this way, the adaptor 300 is configured with a predetermined dimension, i.e., distance E1 (see FIG. 11), for compatibility with one or more predetermined cartridge types, such that a cartridge type that is compatible with the dispenser assembly 100 and the adaptor 300 will have corresponding dimensions to the predetermined distance E1 and a cartridge that is not compatible will not have corresponding dimensions to the predetermined distance E1. In the illustrated embodiment, the predetermined distance E1 is provided to correspond with the diameter D2 of the drive flange 288 of the cartridge 120 (as illustrated in FIG. 11), such that the first catch 404 and the second catch 408 contact the drive flange 288 for movement therewith. Further, the channel height EE1 is provided to correspond with the thickness T2 of the drive flange 288 of the cartridge 120, such that the first catch 404 and the second catch 408 receive the drive flange 288 within the first channel 420 and the second channel 432. In this way, the drive flange 288 is configured to be compatible with the adaptor 300, having corresponding dimensions for enabling compatible operation therewith. It is contemplated that the adaptor 300, including the first leg 312 and the first catch 404 and the second leg 316 and the second catch 408, can be differently shaped and sized to define a larger or smaller channel height EE1 or multiple channel heights. Further, it is contemplated that the drive flange 288 may be differently sized and shaped to define multiple thicknesses T2 and/or multiple diameters D2 to correspond to the adaptor 300. Accordingly, the adaptor 300 and the drive flange 288 can be provided in a variety configurations, i.e., shapes and sizes, to achieve an operable engagement with one another.

With reference to FIG. 6, the moving chassis 296 includes a slot 436 for receiving the adaptor 300, as indicated by the directional arrow. In the illustrated embodiment, the slot 436 is defined between an upper member 440 and a lower member 444 that is opposite the upper member 440, the lower member 444 defining a lower surface 448 and a recessed edge 452 that extends about the receptacle 304. In one instance, the upper member 440 and the lower member 444 are generally U-shaped, although other configurations are possible. The upper member 440 has a lip 456 that extends about the receptacle 304 and varies in height as it protrudes vertically upward from the upper member 440. In addition, the moving chassis 296 has a forward end 458 that is arranged adjacent to the front panel 130 when the dispenser assembly 100 is in a closed position (see FIG. 14).

Figure 14:
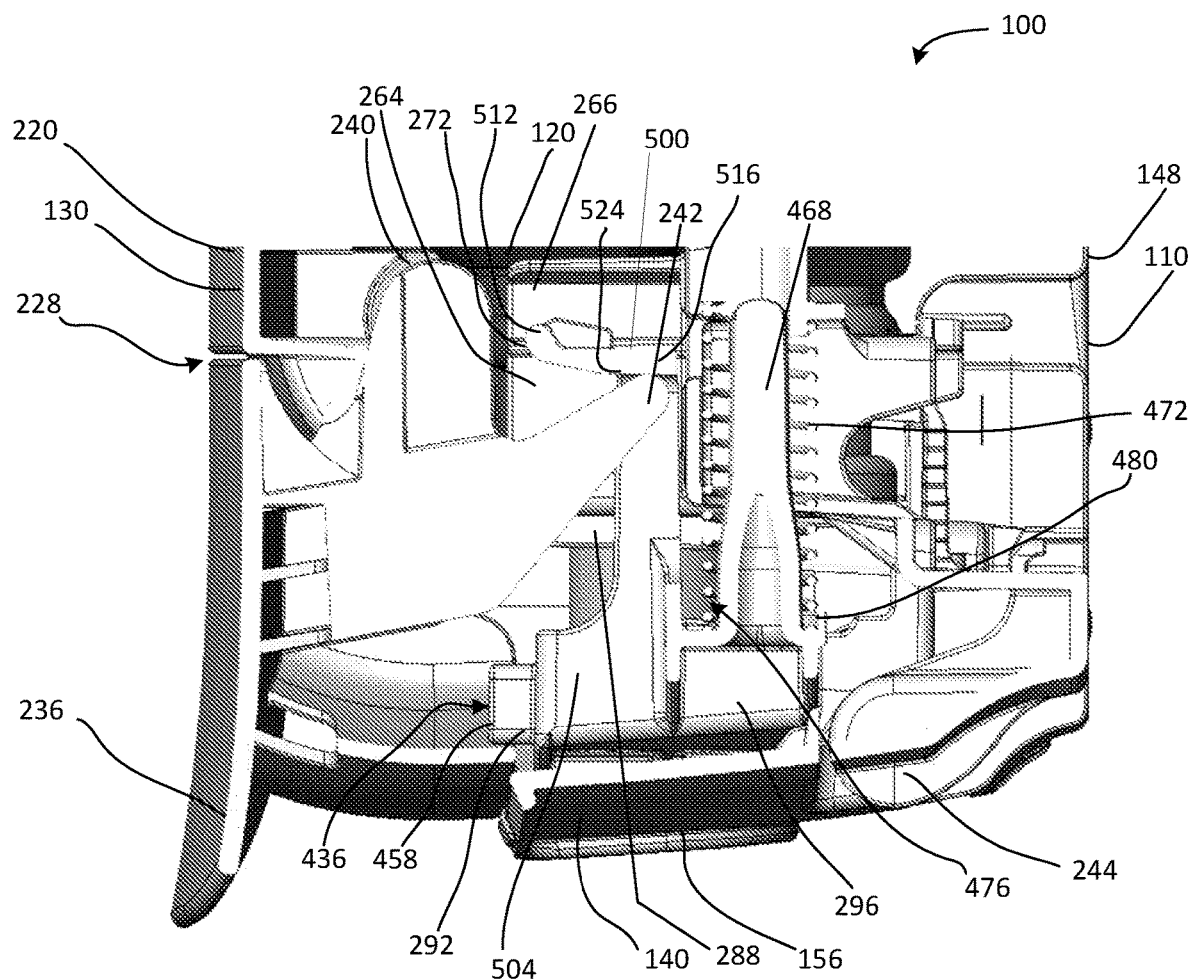
FIG. 14 is a cross sectional view of the operation of the dispenser assembly of FIG. 1.

In addition, the moving chassis 296 has a back end 464 that includes spring posts 468 that are each configured to receive a spring 472 (see FIG. 14). As illustrated in FIG. 6, the spring posts 468 each are generally conical structures that become narrower as they extend vertically upward from a spring seat 476 that is partially surrounded by a curved border 480. Further, the back end 464 of the moving chassis 296 includes a shaft 484 formed by a pair of shaft walls 488, which are L-shaped and extend from a central member 492, and a gap 496 extends between the pair of shaft walls 488. The shaft 484 is configured to be coupled to a rail (not shown) of the body 140 for translation therealong, such as, e.g., sliding, although other configurations are possible.

Figure 7:
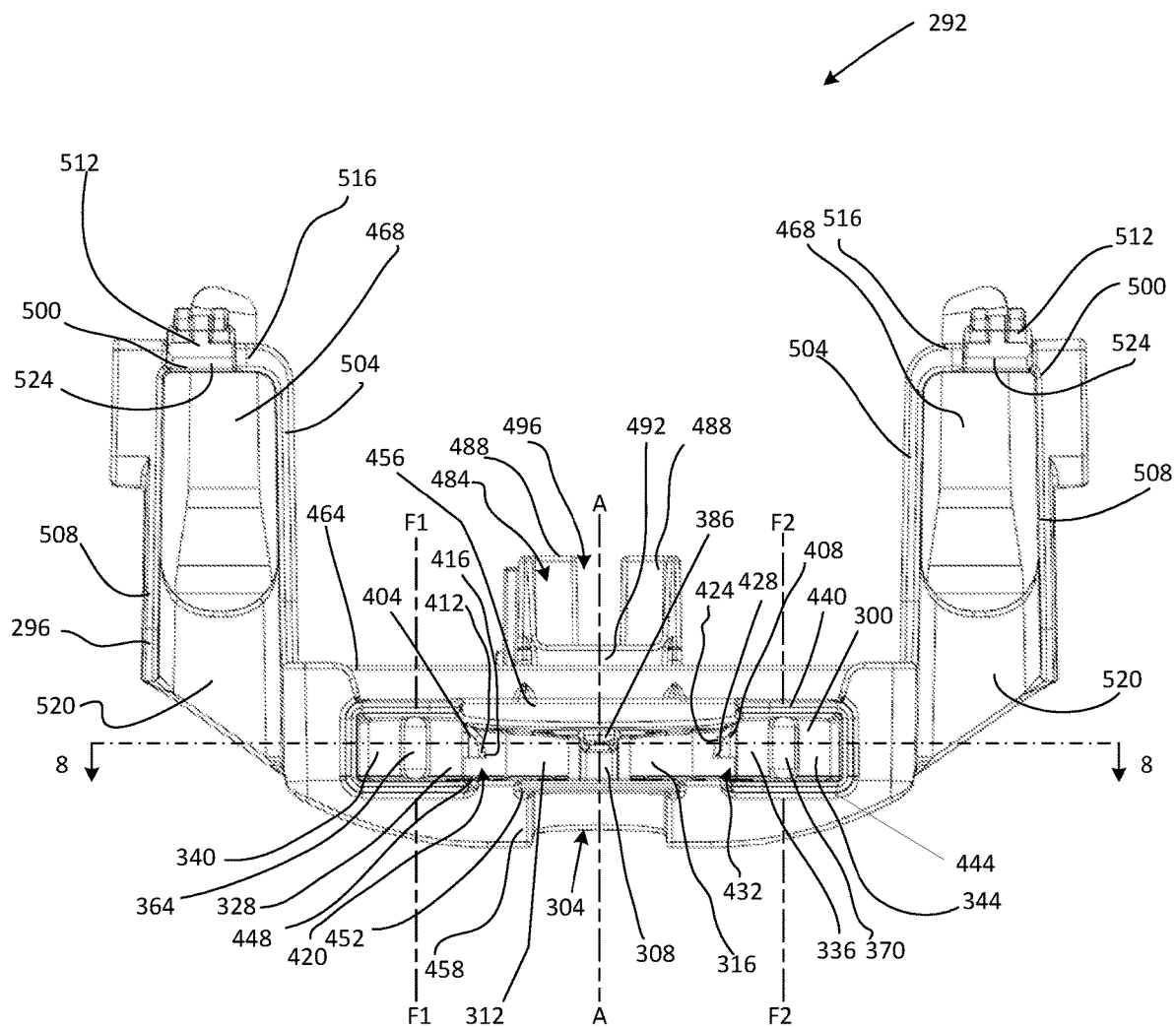
FIG. 7 is a front elevational view of the moving chassis and the first adaptor of the dispenser assembly of FIG. 6, the first adaptor being depicted in an installed state.

Referring to FIGS. 6 and 7, the moving chassis 296 also includes a pair of actuation docks 500 that each have opposing inner walls 504 and outer walls 508. An angled docking wall 512 extends from an upper end 516 that spans between the inner wall 504 and the outer wall 508. Further, an arcuate brace 520 extends between the inner wall 504 and the outer wall 508 below the upper end 516. In the illustrated embodiment, the angled docking wall 512 extends vertically upwardly and forwardly relative to the upper end 516 of the actuation dock 500, and an actuation surface 524 (see FIG. 7) extends continuously from the angled docking wall 512 to the upper end 516. The actuation docks 500 are configured to receive the lever arms 242 (see FIG. 14) of the actuator 236, such that when the front panel 130 is pivoted about the body hinge (not shown) toward the body 140 the lever arms 242 are brought into contact with the actuation surface 524 of the angled docking walls 512. Further, as the front panel 130 is further pivoted to the closed position, the lever arms 242 slide from the angled docking walls 512 to the upper end 516 of the actuation docks 500 while maintaining contact with the actuation surface 524. In this way, the lever arms 242 are positioned for operable engagement with the moving chassis 296.

As illustrated in FIGS. 7 and 8, the adaptor 300 is configured to be received by the moving chassis 296 to form the drive unit 292 of the support structure 264. The height H0 (see FIG. 5) of the adaptor 300 corresponds to a height of the slot 436 for receiving the adaptor 300 therein without excess friction, e.g., in a clearance fit. In addition, the central portion 308 and part of the first leg 312 and the second leg 316 are received within a pocket 390 formed by pocket walls 528 (see FIG. 8) at the back end 464 of the moving chassis 296, where the reduced height H0 of the adaptor 300 at the central portion 308 corresponds to the locator 386 to prevent unauthorized or improper adaptors from being operably received within the slot 436, and also to ensure proper installation of the adaptor 300.

Referring to FIG. 8, the first catch 404 and the second catch 408 are located opposite one another relative to the receptacle 304 and equidistant from the central flex axis F of the central portion 308. Due to the arcuate shape of the first leg 312 and the second leg 316, the adaptor 300 partially surrounds the receptacle 304 of the moving chassis 296 while allowing space within the slot 436 for laterally outward displacement of each of the first leg 312 and the second leg 316 about the central flex axis F.

As best seen in the sectional view of FIG. 8, the first latch 324 is received within a first aperture 532 defined between a first bumper 536 and a first side 540 of the moving chassis 296. Similarly, the second latch 332 is received within a second aperture 544 defined between a second bumper 548 and a second side 552 of the moving chassis 296. To accomplish insertion of the adaptor 300 within the slot 436, the first latch 324 and the second latch 332 slide along the first side 540 and the second side 552, respectively, at the front end 458 of the moving chassis 296, which causes laterally inward displacement of the first latch 324 and the second latch 332. Upon reaching the first aperture 532 and the second aperture 544, the first latch 324 and the second latch 332 snap back into the rest position due to the resistance imparted by the first distal biased region 378 and the second distal biased region 382, such that the first latch 324 extends into the first aperture 532 and the second latch 332 extends into the second aperture 544. In this way, the adaptor 300 is coupled to the moving chassis 296.

In the illustrated embodiment of FIG. 8, when the adaptor 300 is received within the slot 436 and coupled to the moving chassis 296 prior to engagement with the drive flange 288, the first crevice 348 is spaced apart from the first side 540 of the moving chassis 296 and the second crevice 352 is spaced apart from the second side 552 of the moving chassis 296. In addition, due to the shape and size of the adaptor 300, a spacing is provided between the first bumper 536 and the first latch 324 and between the second bumper 548 and the second latch 332. Further, there is a spacing between the first leg 312 and the adjacent pocket walls 528 and between the second leg 316 and the adjacent pocket walls 528, such that laterally outward displacement (e.g., rotation) can occur about the central flex axis F while the adaptor 300 is received within the slot 436 and coupled to the moving chassis 296. In this way, the adaptor 300 is configured to flex within the slot 436 of the moving chassis 296 while simultaneously being coupled to the moving chassis 296.

In addition, the adaptor 300 is configured to be removed from the slot 436 by displacement of the first leg 312 and the second leg 316. This is accomplished by a user squeezing the tabs 364, 370 together to cause the first leg 312 and the second leg 316 to be displaced laterally inwardly, e.g., toward each other, which causes the first latch 324 and the second latch 332 to be displaced from the first aperture 532 and the second aperture 544, respectively. Then, the user removes the adaptor 300 from the slot 436 of the moving chassis 296 and releases the tabs 364, 370, allowing the first leg 312 and the second leg 316 to spring back into the rest position.

As illustrated in FIGS. 7 and 8, the drive axis A is approximately centrally positioned within the receptacle 304 and approximately centrally disposed between the central flex axis F and both of the first distal flex axis F1 and the second distal flex axis F2 of the adaptor 300 when operably received within the slot 436 of the moving chassis 296. In the illustrated embodiment, the central flex axis F and both of the first distal flex axis F1 and the second distal flex axis F2 are parallel with the drive axis A, such that displacement (e.g., rotation) occurs about these vertical axes. Accordingly, the adaptor 300 is configured to be translated vertically by way of its position within the slot 436 of the moving chassis 296 while simultaneously being configured to flex about the central flex axis F, as described below with respect to FIGS. 11-13.

Figure 9:
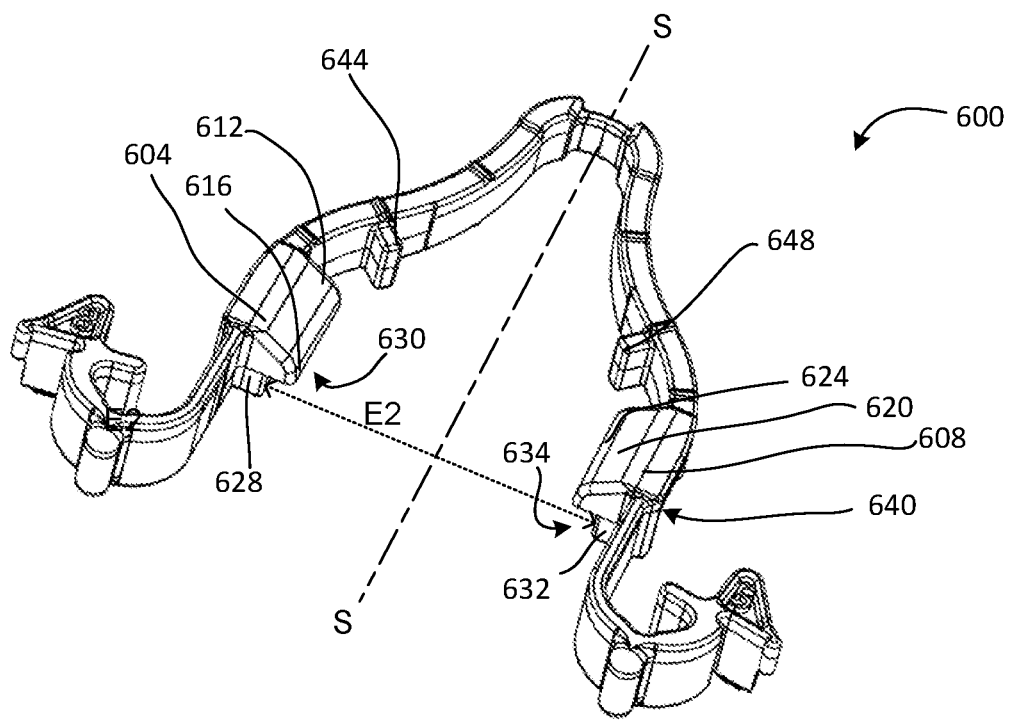
FIG. 9 shows a perspective view of a second adaptor of the dispenser assembly of FIG. 1.

FIG. 9 illustrates another embodiment of an adaptor 600 that is configured to be received within the slot 436 of the moving chassis 296 for use with a compatible cartridge 120, as shown with respect to the adaptor 300 in FIGS. 6-8.

Referring to FIG. 9, the adaptor 600 is substantially identical to the adaptor 300 of FIGS. 5-8, except that the adaptor 600 is configured to be compatible with a different cartridge than the adaptor 300 of the first embodiment. In particular, the adaptor 600 includes a first catch 604 that extends laterally inwardly farther than the first catch 404 of the first embodiment of the adaptor 300, and a second catch 608 that extends laterally inwardly farther than the second catch 408 of the first embodiment of the adaptor 300. Further, the first catch 604 includes a first ramp 612 that extends downwardly and laterally inwardly toward a first tip 616 and the second catch 608 includes a second ramp 620 that extends downwardly and laterally inwardly toward a second tip 624. In addition, the first catch 604 includes a first base member 628 that extends laterally inwardly from the first leg 312 approximately halfway (½) between the first leg 312 and the first tip 616, and the second catch 608 includes a second base member 632 that extends laterally inwardly from the second leg 316 approximately halfway (½) between the second leg 316 and the second tip 624. A predetermined distance E2, which is a retention width, is defined between the first base 628 of the first catch 604 and the second base 632 of the second catch 608. Further, a cavity 640 is formed adjacent each of the first catch 604 and the second catch 608, respectively, of the adaptor 600, such that the first catch 604 and the second catch 608 are generally hollow. In addition, a first rib 644 extends inwardly from the first leg 312 at an angle relative to the longitudinal axis S and a second rib 648 extends inwardly from the second leg 316 at an angle relative to the longitudinal axis S. The first rib 644 and the second rib 648 are configured to abut the drive flange 288 of the cartridge 120 that is sized and shaped to be compatible with the adaptor 600. In particular, the diameter D2 of the drive flange 288 corresponds to the predetermined distance E2 for compatible operation with the adaptor 600. In this way, the first rib 644 and the second rib 648 allow the drive flange 288 to be more easily captured between the first catch 604 and the second catch 608 while also preventing tilting or rotation relative to the adaptor 600.

Figure 10:
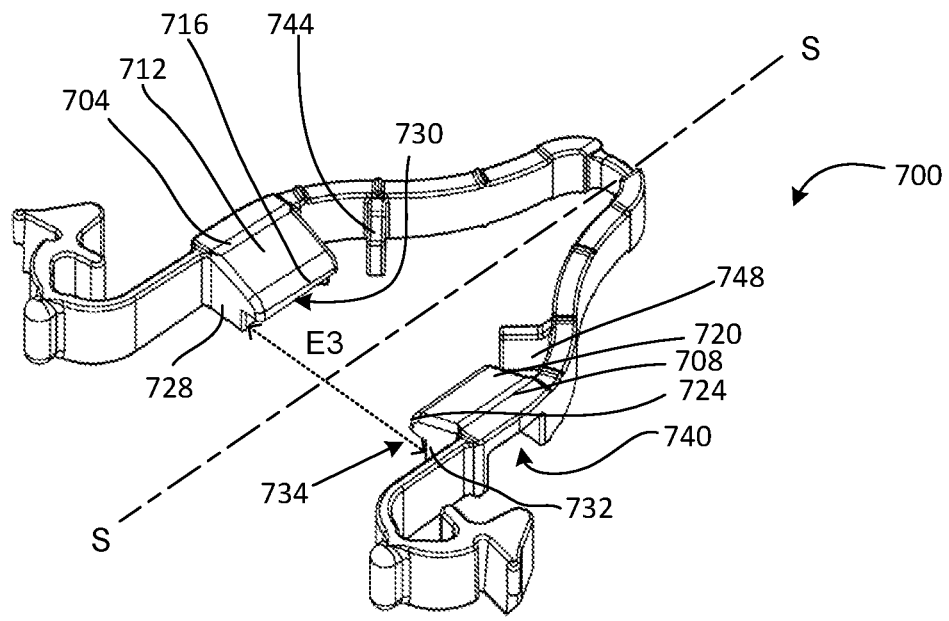
FIG. 10 shows a perspective view of a third adaptor of the dispenser assembly of FIG. 1.

FIG. 10 illustrates yet another embodiment of an adaptor 700 that is configured to be received within the slot 436 of the moving chassis 296 for use with a compatible cartridge type. The adaptor 700 is substantially identical to the adaptor 300 of FIGS. 5-8 and the adaptor 600 of FIG. 9, except that the adaptor 700 is configured to be compatible with a different cartridge than both the adaptor 300 of the first embodiment and the adaptor 600 of the second embodiment. In particular, the adaptor 700 includes a first catch 704 that extends laterally inwardly farther than the first element 604 of the second embodiment of the adaptor 600, and a second catch 708 that extends laterally inwardly farther than the second catch 608 of the second embodiment of the adaptor 600. Further, the first catch 704 includes a first ramp 712 that extends downwardly and laterally inwardly toward a first tip 716 and the second catch 708 includes a second ramp 720 that extends downwardly and laterally inwardly toward a second tip 724. In addition, the first catch 704 includes a first base member 728 that extends laterally inwardly from the first leg 312 approximately two-thirds (⅔) between the first leg 312 and the first tip 716 to form a first channel 730 therebetween and the second catch includes a second base member 732 that extends laterally inwardly from the second leg 316 approximately two-thirds (⅔) between the second leg 316 and the second tip 724 to form a second channel 734 therebetween. A predetermined distance E3, which is a retention width, is defined between the first base member 728 of the first catch 704 and the second base member 732 of the second catch 708. Further, a cavity is 740 formed adjacent each of the first catch 704 and the second catch 708, respectively, of the adaptor 700, such that the first catch 704 and the second catch 708 are generally hollow. In addition, a first rib 744 extends inwardly from the first leg 312 at an angle relative to the longitudinal axis S and a second rib 748 extends inwardly from the second leg 316 at an angle relative to the longitudinal axis S. The first rib 744 and the second rib 748 are configured to abut the drive flange 288 of another cartridge 120 that is compatible with the adaptor 700. In particular, the diameter D2 of the drive flange 288 corresponds to the predetermined distance E3 for compatible operation with the adaptor 700. In this way, the first rib 744 and the second rib 748 allow the drive flange 288 to be more easily captured between the first catch 704 and the second catch 708 while also preventing tilting or rotation relative to the adaptor 700.

As can be appreciated from FIGS. 5, 9, and 10, the predetermined distance E2 is greater than the predetermined distance E3 and less than the predetermined distance E1. The predetermined distances E1, E2, and E3 of the adaptors 300, 600, and 700, respectively, may range from about 0.3 inch (7.62 mm) to about 2 inches (50.8 mm), although other configurations are possible. In one instance, the predetermined distance E1 is about 1 inch (25.4 mm), the predetermined distance E2 is about 0.85 inch (21.59 mm), and the predetermined distance E3 is about 0.7 inch (17.78 mm), although other configurations are possible. It is contemplated that the drive flange 288 may have a diameter D2 in a range of about 0.3 inch (7.62 mm) to about 2 inches (50.8 mm) and, preferably, within a range of about 0.7 inch (17.78 mm) to about 1 inch (25.4 mm).

Figure 12:
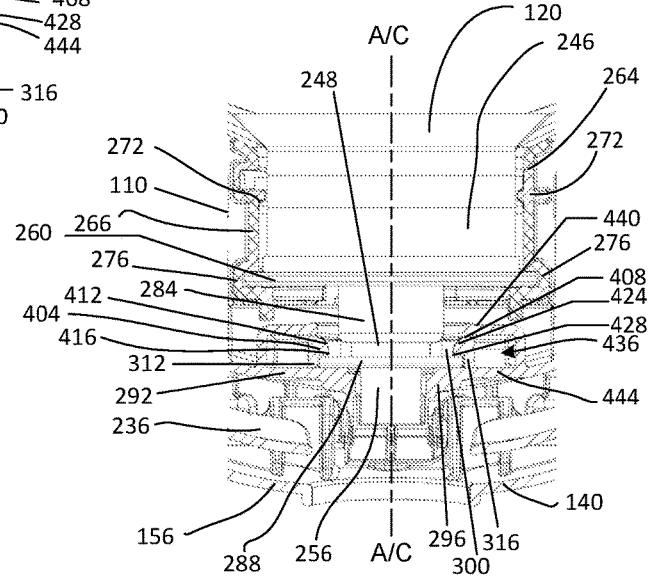
Figure 13:
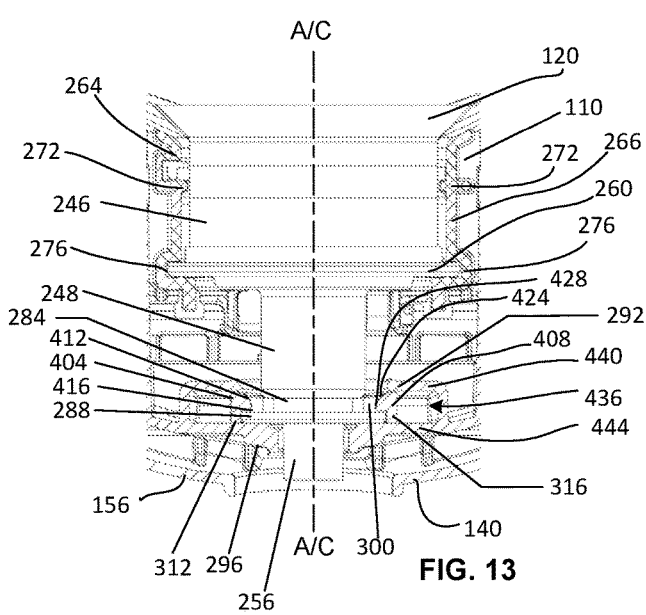

As illustrated in FIGS. 11-13, when the drive flange 288 is compatible with the adaptor 300 that is present within the slot 436 of the moving chassis 296, such that the predetermined distance E1 corresponds to the diameter D2, the drive flange 288 is configured to slide over each of the first and second catch 404, 408 to become captured within the first and second channels 420, 432 and secured to the moving chassis 296. Further, as the drive flange 288 slides over each of the first and second catch 404, 408, each of the first leg 312 and the second leg 316 is displaced (e.g., rotated) outwardly about the central flex axis F and against the resistance imparted by the central biased region 374 (see FIG. 5) of the central portion 308, as well as any additive resistance provided by the material, thickness, dimensions, and curvature of the arcuate shape of each of the first leg 312 and the second leg 316.

Referring to FIG. 11, with the cartridge 120 installed within the support structure 264 of the body 140 in an inverted orientation within the dispenser 110, the housing flange 260 is received within the guide tracks 276 of the collar 266 and the flat portions 268 of the neck 246 are received by the guide projections 272 of the collar 266. In this installed position, the central axis C of the cartridge 120 is aligned with the drive axis A of the drive unit 292, such that the drive flange 288 of the pump 248 is coaxial with the drive axis A. However, as depicted in FIG. 11, the pump 248 is in a pre-primed state in which the valve 284 is fully retracted within the pump housing (not shown). As a result, the drive flange 288 is spaced apart vertically from the adaptor 300 and the receptacle 304 and, more specifically, the drive flange 288 is positioned above the adaptor 300 and below the collar 266. FIG. 11 illustrates that the housing flange 260 has a thickness T1 and diameter D1, that the drive flange 288 has a thickness T2 and diameter D2, and that the adaptor 300 has a predetermined distance E1, which is substantially equivalent or equal to the diameter D2 of the drive flange 288. As a result, the adaptor 300 and the drive flange 288 shown are compatible. If the drive flange 288 was of a smaller diameter D2 and, thus, was incompatible, the first and second catches 404, 408 of the adaptor 300 would pass the drive flange 288 without contact, rendering the drive flange 288 inoperable with the drive unit 292. Alternatively, if the drive flange 288 was of a larger diameter D2 and, thus, was incompatible, the first and second catches 404, 408 would be unable to translate above the drive flange 288 and no sliding engagement would occur, i.e., the drive unit 292 would jam. In the illustrated embodiment, because the valve 284 is fully retracted within the pump housing (not shown) of the cartridge 120, the valve 284 and, thus, the drive flange 288 is prevented from translating vertically upward.

FIG. 12 illustrates a capture stage of the dispenser assembly 100 in which the actuator 236 has been depressed in a substantially longitudinal direction, e.g., rearward, to rotate about the actuator hinge 240 of the front panel 130 for exerting a vertically upward force upon the drive unit 292 by way of the lever arms 242. In the illustrated embodiment, the drive unit 292, i.e., the moving chassis 296 and the adaptor 300, is translated vertically upward to capture the drive flange 288 between the first leg 312 and the second leg 316 of the adaptor 300 and between the first catch 404 and the second catch 408. In addition, the drive flange 288 is captured within the first channel 420 and the second channel 432 of the adaptor 300 such that it is secured between the first catch 404 and the moving chassis 296 as well as between the second catch 408 and the moving chassis 296. At the stage of FIG. 12, the adaptor 300 has been translated vertically, i.e., lifted, to cause the drive flange 288 to slide along the first ramp 412 and the second ramp 424, which results in the first leg 312 and the second leg 316 becoming displaced (e.g., rotated) about the central axis F. After the first tip 416 and the second tip 428 of the adaptor 300 are lifted above the drive flange 288, the central biased region 374 of the central portion 308 (hidden in FIG. 12 but shown in FIG. causes the first leg 312 and the second leg 316 to snap back into the rest position, thereby capturing the drive flange 288 laterally between the first catch 404 and the second catch 408 and vertically between the adaptor 300 and the moving chassis 296. Since the cartridge 120 is secured against vertical translation due to installation within the collar 266, and because the valve 284 is secured against vertical translation due to being fully retracted within the pump housing (not shown) at this stage, the drive flange 288 is not translated in the vertical direction as the adaptor 300 passes above it due to manual operation of the actuator 236. In this way, the drive flange 288 of the pump 248 becomes captured with the drive unit 292.

Referring to FIG. 13, the drive unit 292 has been translated vertically downward back to an initial position, with the drive flange 288 captured between the adaptor 300 and the moving chassis 296. In this initial position, the first leg 312 and the second leg 316 of the adaptor 300 are each simultaneously coupled to the moving chassis 296, e.g., by way of the first latch 324 and the second latch 336, and to the drive flange 288, e.g., by way of the first catch 404 and the second catch 408. The downward vertical translation is caused by the forces exerted by the springs 472 between the collar 266 and the moving chassis 296, such that the moving chassis 296 is biased toward the initial position. Due to the downward vertical translation of the drive flange 288 and, thus, the valve 284 of the pump 248, the pump 248 has become primed by applying a suction to the cartridge body 252 of the cartridge 120 that pulls fluid into the pump 248 for being dispensed upon an actuation and/or operation of the drive unit 292. As illustrated in FIG. 13, the drive flange 288 is engaged with the adaptor 300 and secured to the moving chassis 296 to translate together vertically within the dispenser 110, such that when the actuator 236 is depressed in the longitudinal direction, the drive flange 288, adaptor 300, and moving chassis 296 all translate vertically upward to a stroke position where fluid is dispensed. Then, the springs 472 (see FIG. 14) exert sufficient force upon the moving chassis 296 to cause vertical translation downward that returns the drive flange 288, moving chassis 296, and adaptor 300 to the initial position. In this way, manual operation of the dispenser assembly 100 is accomplished by strokes, i.e., translation from the initial position to the stroke position and then back to the initial position. Accordingly, the drive flange 288, the moving chassis 296, and the adaptor 300 are all configured to translate in a first direction, e.g., vertically upward, before the springs 472 (see FIG. 14) translate the drive flange 288, the moving chassis 296, and the adaptor 300 in a second direction, e.g., vertically downward, to the initial position. In addition, by way of the actuator hinge 240, the actuator 236 is configured to be depressed in a third direction, e.g., longitudinally rearward, that is different from the first and second directions, although other configurations are possible.

As illustrated in FIG. 14, where the dispenser 110 is depicted in the closed position, the actuator 236 is at a rest position, prior to being depressed or rotated about the actuator hinge 240. In the illustrated embodiment, the lever arm 242 is in contact with and pressed against the actuation surfaces 524 of the actuation docks 500, the spring 472 is at a rest position and extends approximately the full length of the post 468, and the drive unit 292 is at an initial position. Accordingly, the drive unit 292 and the actuator 236 are provided so as to avoid lost motion, which can occur when movement of a first component does not cause movement of a second component that is directly linked to the first component. Here, movement (e.g., rotation) of the actuator 236 about the actuator hinge 240 immediately causes vertical translation of the moving chassis 296 and one of the adaptors 300, 600, 700 when installed therein. Thus, lost motion is avoided by the present actuator 236 and drive unit 292 of the dispenser assembly 100, as depicted in FIG. 14.

However, it is contemplated that the drive unit 292 can provide the ability to effect lost motion with the actuator 236. For example, the actuator 236 may be provided with shortened lever arms 242 that do not come into contact with the actuation surface 524 at the initial position. Instead, a gap (not shown) may be present between the lever arms 242 and the actuation surfaces 524 of the moving chassis 296, such that only after the actuator 236 is pivoted about the actuator hinge 240 some partial radial distance, e.g., between about 3 degrees and about 10 degrees relative to the actuator hinge 240, the lever arms 242 come into contact with the actuation surfaces 524 to cause vertical translation of the drive unit 292. In this exemplary way, lost motion may be achieved by the present dispenser assembly 100 to prevent short-strokes that may damage or clog the pump 248 (see FIG. 3), among other performance and user experience issues.

It is further contemplated that the dispenser assembly 100 incorporating the adaptor 300 (see FIGS. 11-13) can provide lost motion between the drive unit 292 and the drive flange 288. For example, the adaptor 300 may capture the drive flange 288 within modified first and second channels (not shown) that have a larger channel height EE1, such that vertical translation of the drive unit 292 does not immediately cause vertical translation of the drive flange 288.

Figure 15:
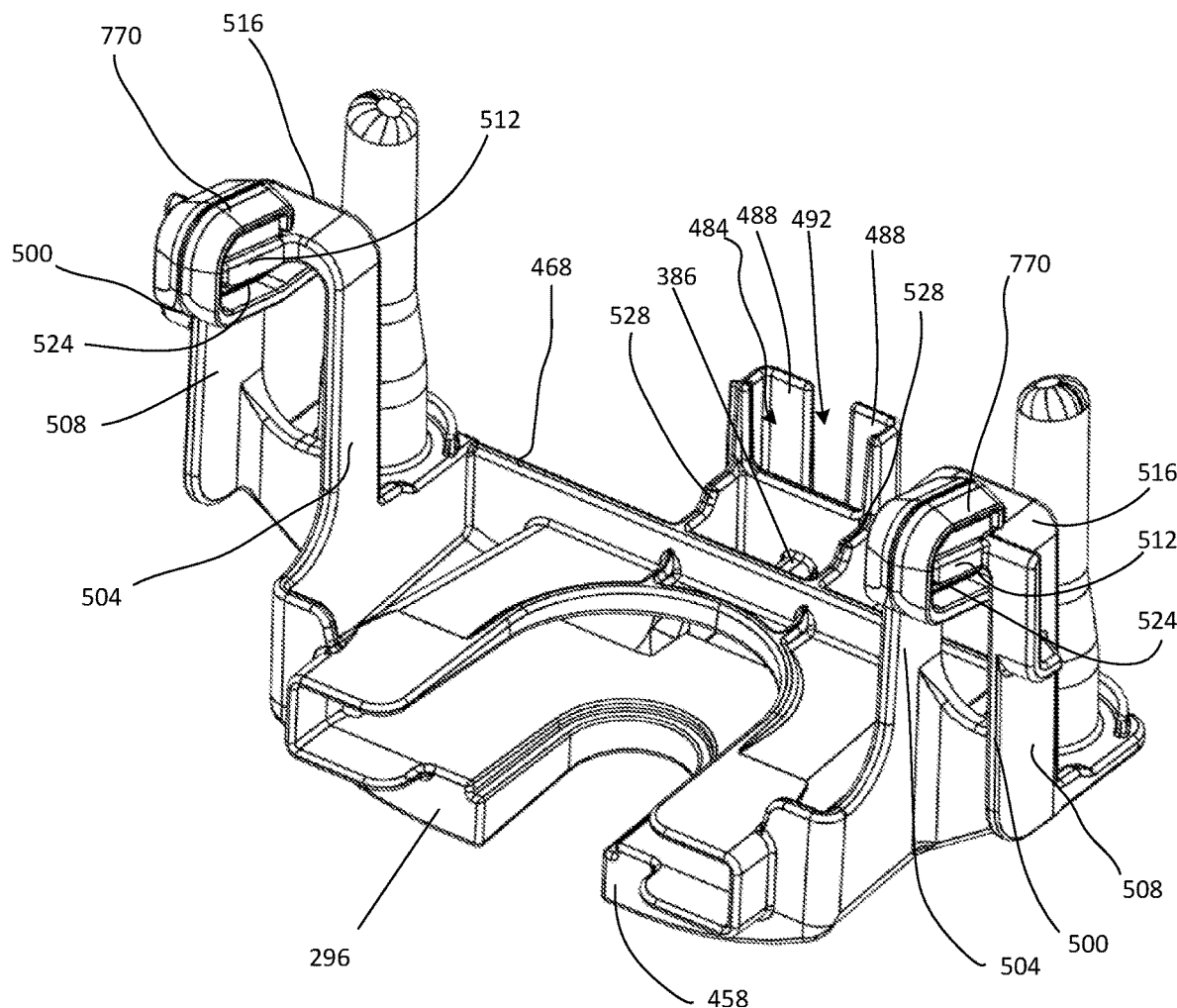
FIG. 15 is a perspective view of the moving chassis being depicted with shot restrictors installed thereon.

On the other hand, it may be desired that the drive unit 292 restricts the amount of fluid dispensed. For example, with reference to FIGS. 14 and 15, a pair of shot restrictors 770 may be coupled to the moving chassis 296 to reduce the distance that the moving chassis 296 translates during actuation. The shot restrictors 770 are provided in the form of generally U-shaped clips that are removably coupled to the angled docking walls 512 of the actuation docks 500, as illustrated in FIG. 15. The shot restrictors 770 are configured to allow the lever arms 242 to slide therealong when the front panel 130 is pivoted from the open position to the closed position (see FIGS. 1 and 2). Further, after the front panel 130 reaches the closed position, the shot restrictors 770 cause the lever arms 242 to push the moving chassis 296 vertically upward toward the collar 266 without depressing the actuator 236. That is, the distance between the moving chassis 296 and the collar 266 is reduced by the shot restrictor 770 being located between the lever arms 242 and the moving chassis 296. In addition, the shot restrictors 770 reduce the vertical distance between the moving chassis 296 and the collar 266 by extending over the upper end 516, between the moving chassis 296 and the collar 266. In this way, the shot restrictors 770 are configured to reduce the distance that the moving chassis 296 can translate in two directions, i.e., vertically upward and vertically downward. By shortening the vertical translation distance of the drive unit 292, the distance that the drive flange 288 translates is shortened, particularly with respect to the priming stage or the return to the initial position. In effect, this results in a modified initial position that is vertically displaced above the original initial position. As a result, the pump 248 is fully primed and, thus, less fluid is pulled into the pump 248 for being dispensed by actuation of the drive unit 292.

Further, each of the adaptors 300, 600, 700 are associated with three different states when received within the dispenser assembly 100. For example, in a first state, the adaptor 300 is received within the moving chassis 296 and no cartridge 120 is installed therein. In a second state, the adaptor 300 is received within the moving chassis 296 and a first type of the cartridge 120 is installed therein, the adaptor 300 and the cartridge 120 being compatible, i.e., the first catch 404 and the second catch 408 of the first adaptor correspond to the drive flange 288 of the first type of the cartridge 120 and/or pump 248 such that the predetermined distance E1 is compatible with the diameter D2. In this second state, the first type of the cartridge 120 is capable of dispensing a fluid by operation of the dispenser 110. In a third state, the adaptor 300 is received within the moving chassis 296, a second type of the cartridge 120, different from the first type of cartridge 120, is installed therein, and the first adaptor 300 is not compatible with the second type of cartridge 120, i.e., the first catch 404 and the second catch 408 of the first adaptor 300 are incompatible with the drive flange of the second type of the cartridge 120 such that the predetermined distance E1 is incompatible with the diameter D2. In the third state, the incompatible drive flange is not captured between the adaptor 300 and the moving chassis 296 and, thus, the incompatible drive flange is not translated with the drive unit 292 to dispense fluid. Accordingly, the first, second, and third states of the adaptor 300 are mutually exclusive. It will be appreciated that the first, second, and third states are identical for the adaptor 600 of FIG. 9 and the adaptor 700 of FIG. 10.

In some embodiments, the adaptors 300, 600, 700 are formed of a stiff plastic, e.g., polyoxymethylene (POM), acrylonitrile butadiene styrene (ABS), nylon, polyethylene, or any other suitable material with relatively high stiffness and stability, although other materials may be used. The adaptors 300, 600, 700 are formed as a single, unitary component, although multiple components or assemblies may be provided without departing from the scope of the disclosure.

It is contemplated that each embodiment of the adaptors 300, 600, 700 may be provided with markings, indicia, coloring, or other means of communicating aspects related to compatibility with one or more cartridges 120. For example, the adaptors 300, 600, 700 and the corresponding drive flange 288 may each include an identical coloration, numerical symbols, or the like to indicate compatibility.

Further, it is contemplated that the adaptors 300, 600, 700 may be provided as a kit with the corresponding cartridge 120. For example, the dispenser 110 may be provided with the body 140 and the adaptor 300 that is configured to couple one type or version of the cartridge 120 to the body 140. The adaptor 300 defines the predetermined distance E1 that corresponds to at least the diameter D2 of the drive flange 288 of the cartridge 120. Further, the dispenser 110 can be provided with the adaptor 600 that is configured to couple another type or version of the cartridge 120 to the body 140. The second adaptor 600 defines the predetermined distance E2 that corresponds to at least the diameter D2 of the drive flange 288 of the cartridge 120, which is different from and incompatible with the predetermined distance E1. Accordingly, the dispenser 110 may be provided with both the adaptors 300 and 600, but only one can be received within the body 140, i.e., within the slot 436 of the moving chassis 296, at a time.

It is contemplated that the adaptors 300, 600, 700 may be provided with greater or fewer numbers of catches and/or latches. In addition, it is contemplated that the adaptor 300, 600, 700 may shaped differently than shown. For example, the adaptor 300 may lack the latches 324, 332 while still being operably engaged with the drive flange 288 and received within the moving chassis 296. For example, central biased region 374 and the predetermined distance E1 of the adaptor 300 provide for a snap-fit capture of the drive flange 288 of compatible diameter D2. Further, the adaptor 300 is received within the slot 436 of the moving chassis 296 and prevented from vertical movement, e.g., by the upper member 440 and the lower member 444, lateral movement, e.g., by the first bumper 536 and the second bumper 548, and longitudinal movement, e.g., by the locator 386 in the pocket 390. Accordingly, it is contemplated that differently shaped adaptors may be used within the dispenser assembly 100.

It is further contemplated that the dispenser assembly 100 may be provided with an electronics module (not shown), e.g., a printed circuit board (PCB), and a power source (not shown), e.g., a battery, for measuring, recording, transmitting, and/or information related to the operation and/or status of the dispenser assembly 100. In one example, an electronic module (not shown) records or counts the frequency with which the dispenser assembly 100 is used, such as with a magnet (not shown) that is coupled to the moving chassis 296 for vertical translation therewith to interact with a sensor (not shown) of the electronic module (not shown) at particular coordinates.

Although one or more preferred embodiments have been described, it will be appreciated that various changes or modifications may be made without departing from the scope defined in the appended claims.

The invention claimed is:

1. A method of providing a dispenser for dispensing a fluid, the method comprising:
   providing a body;
   providing a first adaptor that is configured to couple a first cartridge to the body, the first adaptor defining a first dimension that corresponds to a portion of the first cartridge, the first cartridge defining a first central axis, and
   providing a second adaptor that is configured to couple a second cartridge to the body, the second adaptor defining a second dimension that corresponds to a portion of the second cartridge, the second cartridge defining a second central axis, wherein the first dimension is different from the second dimension,
   wherein the first adaptor and the second adaptor are configured to be flexible,
   wherein the first adaptor is configured to be removably received within a slot of a moving chassis and translated along a drive axis that is coaxial with the first central axis when the first cartridge is located in the dispenser, and
   wherein the first adaptor and the second adaptor are configured to be interchangeably coupled to the moving chassis.

2. The method of claim 1, wherein the first adaptor includes first catches and the second adaptor includes second catches,
   wherein the first dimension is defined between the first catches of the first adaptor and the second dimension is defined between the second catches of the second adaptor, and
   wherein the first adaptor and the second adaptor are substantially identical to each other except for the first and second dimensions.

3. The method of claim 1, wherein the first cartridge and the second cartridge are different with respect to at least one of a pump, a cartridge body, and the fluid to be dispensed.

4. The method of claim 1, wherein the first dimension of the first adaptor is incompatible with the portion of the second cartridge and the second dimension of the second adaptor is incompatible the portion of the first cartridge.

5. The method of claim 1, wherein the first cartridge is capable of dispensing the fluid when the first adaptor is operably received within the body.

6. The method of claim 5, wherein only one of the first adaptor and the second adaptor can be operably received within the body at a time.

7. The method of claim 1, wherein the body includes a front cover that is rotatably mounted to the body about a hinge, the front cover including an actuator that is rotatable about an actuator hinge that is spaced apart from the hinge of the body.

8. The method of claim 7, wherein the actuator is configured to contact a moving chassis within the body when the front cover is mounted to the body in a closed position and when the first or second adaptor is received within the slot.

9. The method of claim 8, wherein, in the closed position, when the actuator rotates about the actuator hinge, the moving chassis translates within the body.

10. The method of claim 9, wherein, in the closed position, when the actuator rotates about the actuator hinge and when the first or second adaptor is received within the slot, the first adaptor or the second adaptor, translates with the moving chassis.

11. The method of claim 1, wherein the second adaptor is configured to be removably received within the slot of the moving chassis and translated along the drive axis that is coaxial with the first central axis when the first cartridge is located in the dispenser.

12. A system for dispensing fluid via a dispenser, the system comprising:
    a body;
    a first adaptor that is configured to couple a first cartridge to the body, the first adaptor defining a first dimension that corresponds to a portion of the first cartridge, the first cartridge defining a first central axis; and
    a second adaptor that is configured to couple a second cartridge to the body, the second adaptor defining a second dimension that corresponds to a portion of the second cartridge, the second cartridge defining a second central axis,
    wherein the first adaptor and the second adaptor are configured to be flexible,
    wherein the first adaptor is configured to be removably received within a slot of a moving chassis and translated along a drive axis that is coaxial with the first central axis when the first cartridge is located in the dispenser, and
    wherein the first adaptor and the second adaptor are configured to be interchangeably coupled to the moving chassis.

13. The system of claim 12, wherein the first adaptor includes first catches and the second adaptor includes second catches,
    wherein the first dimension extends between the first catches of the first adaptor and the second dimension extends between the second catches of the second adaptor, and
    wherein the first adaptor and second adaptor are substantially identical to each other except for the first and second dimensions.

14. The system of claim 13, wherein the body includes a front cover that is rotatably mounted to the body about a hinge, the front cover including an actuator that is rotatable about an actuator hinge that is spaced apart from the hinge of the body.

15. The system of claim 14, wherein the actuator is configured to contact the moving chassis within the body when the front cover is mounted to the body in a closed position and when the first or second adaptor is received within the slot.

16. The system of claim 14, wherein, in the closed position, when the actuator rotates about the actuator hinge, the moving chassis translates within the body.

17. The system of claim 16, wherein, in the closed position, when the actuator rotates about the actuator hinge and when the first or second adaptor is received within the slot, the first adaptor or the second adaptor, translates with the moving chassis.

18. The system of claim 12, wherein the second adaptor is configured to be removably received within the slot of the moving chassis and translated along the drive axis that is coaxial with the first central axis when the first cartridge is located in the dispenser.

19. A system for dispensing a fluid, the system comprising:
    a dispenser including a cover that is attached to a body, wherein the cover is movable between an open configuration and a closed configuration, wherein an interior cavity of the dispenser is exposed in the open configuration, and wherein a support structure is disposed within the interior cavity of the dispenser, the support structure having a movable chassis;

a first cartridge including a first pump with a first drive flange, wherein the first cartridge is configured to contain a first fluid, and wherein the first pump is configured to be actuated to dispense the first fluid when the first drive flange is operably coupled to the chassis;

a second cartridge including a second pump with a second drive flange, wherein the second cartridge is configured to contain a second fluid, and wherein the second pump is configured to be actuated to dispense the second fluid when the second drive flange is operably coupled to the chassis; and an adaptor that is configured to be received within a receptacle of the chassis of the support structure to operably couple the first pump of the first cartridge or second pump of the second cartridge to the chassis, wherein the adaptor and the chassis are configured to move together in an axial direction when the dispenser is actuated, wherein the adaptor is configured to be inserted within the receptacle in a direction that is different from the axial direction, and wherein the first cartridge and the second cartridge are configured to be interchangeably coupled to the chassis.

20. The system of claim 19, wherein the first fluid is a viscous fluid and the second fluid is a non-viscous fluid.

21. The system of claim 19, wherein the pump of the first cartridge is a foam-type pump and the pump of the second cartridge is a liquid-type pump.

22. The system of claim 19, wherein the adaptor has a dimension that is compatible with the first drive flange and incompatible with the second drive flange.

* * * * *